(12) United States Patent
Neri et al.

(10) Patent No.: US 12,482,556 B2
(45) Date of Patent: Nov. 25, 2025

(54) VALUE-BASED ADVANCED CLINICAL BENCHMARKING

(71) Applicant: Fresenius Medical Care Deutschland GmbH, Bad Homburg (DE)

(72) Inventors: Luca Neri, Milan (IT); Francesco Bellocchio, Siziano (IT); Carlo Barbieri, Crema (IT); Stefano Stuard, Bad Homburg (DE); Jasmine Ion Titapiccolo, Cernusco sul Naviglio (IT); Paola Carioni, Credera Rubbiano (IT)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 776 days.

(21) Appl. No.: 17/743,751

(22) Filed: May 13, 2022

(65) Prior Publication Data
US 2022/0406444 A1  Dec. 22, 2022

(30) Foreign Application Priority Data

Jun. 22, 2021  (EP) .................................... 21180742

(51) Int. Cl.
*G16H 40/20* (2018.01)
*G16H 40/63* (2018.01)
(Continued)

(52) U.S. Cl.
CPC ............. *G16H 40/20* (2018.01); *G16H 40/63* (2018.01); *G16H 50/20* (2018.01); *G16H 50/70* (2018.01)

(58) Field of Classification Search
CPC ........ G16H 40/20; G16H 40/63; G16H 50/20; G16H 50/70; G16H 50/30
See application file for complete search history.

(56) References Cited

U.S. PATENT DOCUMENTS

2005/0075597 A1*  4/2005  Vournakis ............... A61P 31/14
                                                    514/807
2011/0077958 A1   3/2011  Breitenstein et al.
(Continued)

FOREIGN PATENT DOCUMENTS

| CN | 111243753 A | * | 6/2020 | ........... G06F 16/215 |
|---|---|---|---|---|
| EP | 3 739 596 A1 | | 11/2020 | |
| WO | WO 2019/072692 A1 | | 4/2019 | |

OTHER PUBLICATIONS

Attal et. al. "Indicators of Quality of Clinical Care for Type 2 Diabetes Patients in Primary Health Care Centers Patients in Primary Health Care Centers in Qatar: A Retrospective Analysis." International Journal of Endocrinology : NA. Hindawi Limited. (Dec. 31, 2019)) (Year: 2019).*
(Continued)

*Primary Examiner* — Linh Giang Le
(74) *Attorney, Agent, or Firm* — Leydig, Voit & Mayer, Ltd.

(57) ABSTRACT

A computer-implemented method and system for analyzing data related to a plurality of healthcare delivery units includes: collecting data from different data sources related to the plurality of healthcare delivery units; computing, based on the collected data, for individual patients associated with any one of the plurality of healthcare delivery units, an expected frequency of at least one type of health outcome for each of the individual patients; and generalizing the computed expected frequencies of the at least one type of health outcome for the individual patients into one or more individual-level impact metrics associated with one or more risk factors for the at least one type of health outcome. The one or more risk factors include one or more modifiable risk factors and one or more un-modifiable risk factors.

18 Claims, 15 Drawing Sheets

(51) Int. Cl.
*G16H 50/20* (2018.01)
*G16H 50/70* (2018.01)

(56) References Cited

U.S. PATENT DOCUMENTS

| | | | |
|---|---|---|---|
| 2015/0186607 A1 | 7/2015 | Geleijnse et al. | |
| 2016/0371453 A1* | 12/2016 | Bowman | G16H 10/60 |
| 2018/0182475 A1 | 6/2018 | Cossler et al. | |
| 2020/0302296 A1* | 9/2020 | Miller | G06N 20/20 |
| 2021/0020060 A1 | 1/2021 | Hirsch | |

OTHER PUBLICATIONS

"Decision tree learning," *Wikipedia* (Jan. 4, 2015).
"Exponential family," *Wikipedia* (Jun. 16, 2021).
International Patent Application No. PCT/EP2022/065848, International Search Report (Sep. 26, 2022).
European Patent Office, Office Action in European Patent Application No. 21180742 mailed Oct. 17, 2025, 13 pp.

* cited by examiner

VALUE-BASED ADVANCED CLINICAL BENCHMARKING

CROSS-REFERENCE TO RELATED APPLICATIONS

Priority is claimed to European Patent Application No. EP 21180742.5, filed on Jun. 22, 2021, the entire disclosure of which is hereby incorporated by reference herein.

TECHNICAL FIELD

The present invention relates, in general, to Continuous Quality Improvement (CQI) programs in healthcare and, more particularly, to a method, an apparatus and a computer program for analyzing data related to a plurality of healthcare delivery units, e.g. to improve performance of a target healthcare delivery unit.

BACKGROUND

Clinical data contains a multitude of information pertaining to patient health, clinical resources, and interactions of several groups of clinical users. A use case of clinical data analytics of high contemporary relevance is given in the prediction of aggregated incidence of a future occurrence of a certain health outcome event from past and presently obtained data in healthcare delivery units for benchmarking and Continuous Quality Improvement (CQI). A healthcare delivery unit may include one or more devices or components of treatment and/or information systems in a healthcare provider setting, such as a clinic, hospital, treatment center (e.g. dialysis center) and/or other healthcare location. For a certain health outcome, a healthcare-delivery-unit-level incidence is associated to an aggregated impact of risk factors distribution in a case mix of the healthcare delivery unit. A total health outcome risk for an individual patient is given by the health outcome risk as effect of several chains of causal sub-events with respective risks. Several publications in this field disclose the risk prediction of adverse clinical events and/or health outcomes, their progression and the modification of the prediction reliability and efficiency by the choice of different data sets and/or analytical models. The dynamics of underlying input data and the transferability of predictions between different affected user groups and their effect on reliable risk predictions is discussed in WO 2019/072692 A1.

While a predicted meta-value related to a risk is helpful to evaluate the occurrence of a certain clinical event, the factors contributing to the risk, and the metadata generated from them as input into the prediction analysis, vary strongly between different sub-sets of healthcare delivery units and patients in degree of availability and impact. Additionally, with the usual multi-causality of health outcomes, a prediction of occurrence alone cannot certainly help the mitigation.

SUMMARY

In an exemplary embodiment, the present invention provides a system. The system includes: a plurality of healthcare delivery units; a plurality of gateways in communication with the plurality of healthcare delivery units; and a processing system. The plurality of healthcare delivery units include treatment systems configured to: perform treatments for respective patients associated with the plurality of healthcare delivery units; obtain data associated with the respective patients, including treatment-related data; and send the obtained data to the processing system via the plurality of gateways and a communication network. The processing system is configured to: receive the data associated with the respective patients; compute, based on the received data, for the respective patients, expected frequencies of at least one type of health outcome; and generalize the computed expected frequencies of the at least one type of health outcome for the respective patients into one or more individual-level impact metrics associated with risk factors for the at least one type of health outcome, wherein the risk factors comprise one or more modifiable risk factors and one or more un-modifiable risk factors.

In a further exemplary embodiment, the treatments systems of the plurality of healthcare delivery units comprise one or more dialysis machines.

In another exemplary embodiment, the present invention provides a computer-implemented method for analyzing data related to a plurality of healthcare delivery units, the method comprising: collecting data from different data sources related to the plurality of healthcare delivery units; computing, based on the collected data, for respective patients associated with the plurality of healthcare delivery units, expected frequencies of at least one type of health outcome; and generalizing the computed expected frequencies of the at least one type of health outcome for the respective patients into one or more individual-level impact metrics associated with risk factors for the at least one type of health outcome, wherein the risk factors comprise one or more modifiable risk factors and one or more un-modifiable risk factors.

In a further exemplary embodiment, collecting the data from the different data sources comprises consolidating the data from the different data sources.

In a further exemplary embodiment, the method further includes: extracting a set of features from the data from the different data sources.

In a further exemplary embodiment, computing the expected frequencies of the at least one type of health outcome comprises: obtaining one or more analytical models for a set of features extracted from the data and for the at least one type of health outcome.

In a further exemplary embodiment, the one or more analytical models comprise an exponential distribution family, a derivative of an exponential distribution family, a Bayesian network, an artificial neural network, and/or a non-parametric method.

In a further exemplary embodiment, the non-parametric method comprises use of a decision tree, k-Nearest neighbors, and/or a support vector machine.

In a further exemplary embodiment, the method further includes: setting up a model architecture based on a Continuous Quality Improvements (CQI) structure.

In a further exemplary embodiment, the method further includes: training n+m risk models based on the obtained one or more analytical models and the model architecture, wherein n represents the number of the at least one type of health outcome and m represents the number of the one or more modifiable risk factors.

In a further exemplary embodiment, the method further includes: evaluating calibration and accuracy of the n+m risk models in a test set.

In a further exemplary embodiment, the method further includes: adjusting the risk models based on a newly configured model architecture and model parameters.

In a further exemplary embodiment, the method further includes: applying the one or more analytical models to the collected data to compute the expected frequencies for the at least one type of health outcome for the respective patients.

In a further exemplary embodiment, generalizing the computed expected frequencies of the at least one type of health outcome for the respective patients comprises: applying aggregation rules to translate the computed expected frequencies for the respective patients into a healthcare-delivery-unit-level expected frequency for each of the healthcare delivery units; identifying a level of contribution of each of the risk factors to the healthcare-delivery-unit-level expected frequency of the at least one type of health outcome for each of the healthcare delivery units within the plurality of healthcare delivery units, or a benchmarking subset thereof; and computing the one or more individual-level impact metrics associated with the risk factors based on the identified level of contribution.

In a further exemplary embodiment, the method further includes: constructing, for each healthcare delivery unit within the plurality of healthcare delivery units, or a subset thereof, a standard population scenario to estimate, based on the one or more individual-level impact metrics, a modified expected frequency of the at least one type of health outcome that would be expected if a distribution of the one or more non-modifiable risk factors was fixed to a distribution observed in the standard population.

In a further exemplary embodiment, the method further includes: ranking the healthcare delivery units within the plurality of healthcare delivery units, or the subset thereof, based on the estimated modified expected frequencies of the at least one type of health outcome that would be expected in the standard population.

In a further exemplary embodiment, the method further includes: aggregating the one or more individual-level impact metrics associated with the one or more risk factors for each healthcare delivery unit within the plurality of healthcare delivery units, or a subset thereof; and normalizing the one or more individual-level impact metrics into a healthcare-delivery-unit-level impact metric for each healthcare delivery unit within the plurality of healthcare delivery units, or the subset thereof.

In a further exemplary embodiment, the method further includes: identifying a level of contribution of each of one or more new risk factors to an expected frequency of the at least one type of health outcome for at least one healthcare delivery unit within the plurality of healthcare delivery units, wherein the one or more new risk factors are associated with one or more emerging medical needs.

In a further exemplary embodiment, the method further includes: ranking the one or more emerging medical needs based on the corresponding identified level of contribution to the expected frequency of the at least one type of health outcome.

In a further exemplary embodiment, the method further includes, for at least one of the one or more modifiable risk factors: defining a target frequency of the at least one type of health outcome at a target healthcare delivery unit; computing patient-level target achievement probabilities at the target healthcare delivery unit based on the healthcare-delivery-unit-level impact metrics; aggregating the patient-level target achievement probabilities to compute an expected target achievement prevalence at the target healthcare delivery unit; and computing an expected margin of improvement for the target healthcare delivery unit by comparing the expected target achievement prevalence with a prevalence based on a distribution of the one or more non-modifiable risk factors observed in a standard population.

In a further exemplary embodiment, the method further includes: displaying, on a graphical user interface (GUI), the expected margin of improvement for the at least one modifiable risk factor for the target healthcare delivery unit; and/or displaying, on the GUI, guidance for addressing at least one unmet medical need for the target healthcare delivery unit, wherein the unmet medical need is associated with under-achievement in the at least one modifiable risk factor for which an actionable improvement margin has been discovered based on the computed expected margin of improvement; and/or displaying, on the GUI, for the target healthcare delivery unit, a sequence of features to modify with respect to successive risk reduction of the at least one type of health outcome, based on the computed expected margin of improvement.

In yet another exemplary embodiment, the present invention provides one or more non-transitory computer-readable mediums having processor-executable instructions stored thereon for analyzing data related to a plurality of healthcare delivery units. The processor-executable instructions, when executed, facilitate: collecting data from different data sources related to the plurality of healthcare delivery units; computing, based on the collected data, for respective patients associated with the plurality of healthcare delivery units, expected frequencies of at least one type of health outcome; and generalizing the computed expected frequencies of the at least one type of health outcome for the respective patients into one or more individual-level impact metrics associated with risk factors for the at least one type of health outcome, wherein the risk factors comprise one or more modifiable risk factors and one or more un-modifiable risk factors.

BRIEF DESCRIPTION OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. Features and advantages of various embodiments of the present invention will become apparent by reading the following detailed description with reference to the attached drawings which illustrate the following.

DETAILED DESCRIPTION

Figure 1:
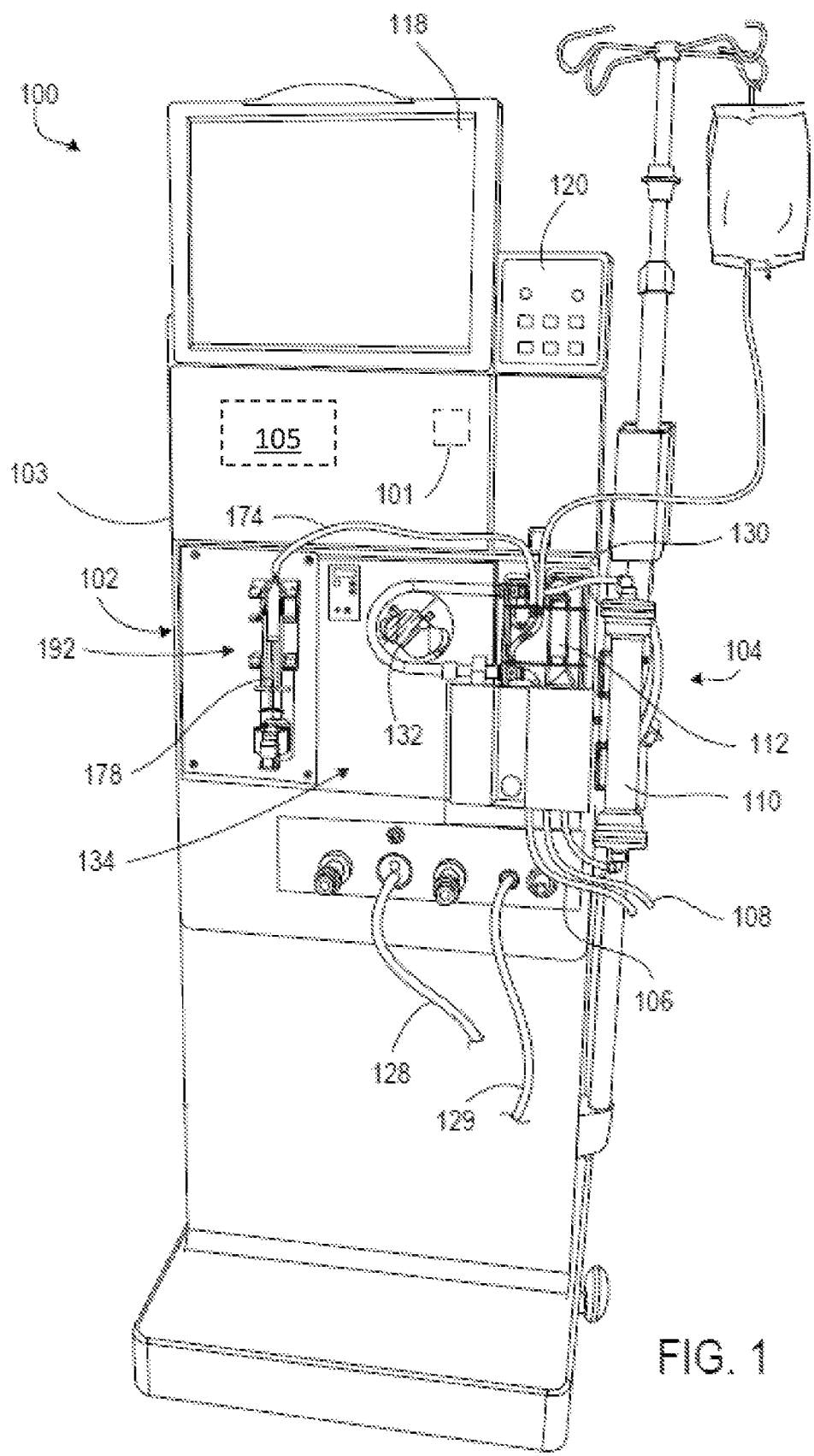
FIG. 1 depicts an exemplary hemodialysis system.

Exemplary embodiments of the present invention provide a method, an apparatus and a computer program within Continuous Quality Improvement (CQI) programs in healthcare, incorporating:

1) a fair comparison in clinical performance by disentangling true practice-dependent differences in health outcomes from differences solely due to imbalances of unmodifiable factors (i.e. age, gender and the likes) across different healthcare delivery units;
2) a method to consistently rank emerging medical needs based on priority for each healthcare delivery unit based on data-driven expectation on future health outcomes; and
3) a method to consistently rank potential policy interventions based on credible, data-driven margin of improvement expectations.

According to a first aspect of the invention, a computer-implemented method is provided for analyzing data related to a plurality of healthcare delivery units. The method may include collecting data from different data sources related to the plurality of healthcare delivery units; computing, based on the collected data, for individual patients associated with any one of the plurality of healthcare delivery units, an expected frequency of at least one type of health outcome for each of the individual patients; and generalizing the computed expected frequencies of the at least one type of health outcome for the individual patients into one or more individual-level impact metrics associated with one or more risk factors for the at least one type of health outcome, wherein the one or more risk factors comprise one or more modifiable risk factors and one or more un-modifiable risk factors.

Further, according to the first aspect of the invention, an apparatus is provided for analyzing data related to a plurality of healthcare delivery units. The apparatus may include a processor, a memory in electronic communication with the processor, and instructions stored in the memory. The instructions may be executed by the processor to cause the apparatus to perform the following steps: collecting data from different data sources related to the plurality of healthcare delivery units; computing, based on the collected data, for individual patients associated with any one of the plurality of healthcare delivery units, an expected frequency of at least one type of health outcome for each of the individual patients; and generalizing the computed expected frequencies of the at least one type of health outcome for the individual patients into one or more individual-level impact metrics associated with one or more risk factors for the at least one type of health outcome, wherein the one or more risk factors comprise one or more modifiable risk factors and one or more un-modifiable risk factors.

Further, according to the first aspect of the invention, an apparatus is provided for analyzing data related to a plurality of healthcare delivery units. The apparatus may include means for collecting data from different data sources related to the plurality of healthcare delivery units (e.g., a communication interface, including a receiver); means for computing, based on the collected data, for individual patients associated with any one of the plurality of healthcare delivery units, an expected frequency of at least one type of health outcome for each of the individual patients (e.g., a processor); and means for generalizing the computed expected frequencies of the at least one type of health outcome for the individual patients into one or more individual-level impact metrics associated with one or more risk factors for the at least one type of health outcome (e.g., the processor), wherein the one or more risk factors comprise one or more modifiable risk factors and one or more un-modifiable risk factors.

Further, according to the first aspect of the invention, a non-transitory computer-readable medium storing code for analyzing data related to a plurality of healthcare delivery units is provided. The code may include instructions executable by a processor for performance of the following steps: collecting data from different data sources related to the plurality of healthcare delivery units; computing, based on the collected data, for individual patients associated with any one of the plurality of healthcare delivery units, an expected frequency of at least one type of health outcome for each of the individual patients; and generalizing the computed expected frequencies of the at least one type of health outcome for the individual patients into one or more individual-level impact metrics associated with one or more risk factors for the at least one type of health outcome, wherein the one or more risk factors comprise one or more modifiable risk factors and one or more un-modifiable risk factors.

According to a second aspect of the invention, some examples of the method, apparatuses, and non-transitory computer-readable medium according to the first aspect of the invention may further include operations, features, means, or instructions for consolidating data from the different data sources. Further, optionally, some examples of the method, apparatuses, and non-transitory computer-readable medium described herein may further include operations, features, means, or instructions for extracting a set of features from the data from the different data sources.

According to a third aspect of the invention, some examples of the method, apparatuses, and non-transitory computer-readable medium according to the first or the second aspects of the invention may further include operations, features, means, or instructions for obtaining one or more analytical models suitable for a set of features extracted from the data and for the at least one type of health outcome. The one or more analytical models may preferably comprise an exponential distribution family, a derivative of an exponential distribution family, a Bayesian network, an artificial neural network, and/or a non-parametric method. The non-parametric method may preferably comprise use of a decision tree, k-Nearest neighbors, and/or a support vector machine.

According to a fourth aspect of the invention, some examples of the method, apparatuses, and non-transitory computer-readable medium according to the third aspect of the invention may further include operations, features, means, or instructions for setting up a model architecture based on a Continuous Quality Improvements (CQI) structure.

According to a fifth aspect of the invention, some examples of the method, apparatuses, and non-transitory computer-readable medium according to the fourth aspect of the invention may further include operations, features, means, or instructions for training (F) n+m risk models based on the obtained one or more analytical models and the model architecture. Here n represents the number of the at least one type of health outcome and m represents the number of the one or more modifiable risk factors. Further, optionally, some examples of the method, apparatuses, and non-transitory computer-readable medium described herein may further include operations, features, means, or instructions for evaluating calibration and accuracy of the n+m risk models in a test set.

According to a sixth aspect of the invention, some examples of the method, apparatuses, and non-transitory computer-readable medium according to any of the third to fifth aspects of the invention may further include operations, features, means, or instructions for applying the one or more analytical models to the collected data to predict the expected frequency for the at least one type of health outcome for the individual patients.

According to a seventh aspect of the invention, some examples of the method, apparatuses, and non-transitory computer-readable medium according to any of the first to sixth aspects of the invention may further include operations, features, means, or instructions for applying aggregation rules to translate said computed expected frequencies for the individual patients into a healthcare-delivery-unit-level expected frequency for each of the healthcare delivery units; identifying a level of contribution of each of the one or more risk factors to the healthcare-delivery-unit-level expected frequency of the at least one type of health outcome for each of the healthcare delivery units within the plurality of healthcare delivery units, or a benchmarking subset thereof and computing the one or more individual-level impact metrics associated with the one or more risk factors based on the identified level of contribution.

According to an eighth aspect of the invention, some examples of the method, apparatuses, and non-transitory computer-readable medium according to the seventh aspect of the invention may further include operations, features, means, or instructions for constructing, for each healthcare delivery unit within the plurality of healthcare delivery units, or a subset thereof, a standard population scenario to estimate, based on the one or more individual-level impact metrics, a modified expected frequency of the at least one type of health outcome that would be expected if a distribution of the one or more non-modifiable risk factors was fixed to a distribution observed in the standard population. Further, optionally, some examples of the method, apparatuses, and non-transitory computer-readable medium described herein may further include operations, features, means, or instructions for ranking the healthcare delivery units within the plurality of healthcare delivery units, or the subset thereof, based on the estimated modified expected frequencies of the at least one type of health outcome that would be expected in the standard population.

According to a ninth aspect of the invention, some examples of the method, apparatuses, and non-transitory computer-readable medium according to any of the first to eighth aspects of the invention may further include operations, features, means, or instructions for aggregating the one or more individual-level impact metrics associated with the one or more risk factors for each healthcare delivery unit within the plurality of healthcare delivery units, or a subset thereof; and normalizing said one or more individual-level impact metrics into a healthcare-delivery-unit-level impact metric for each healthcare delivery unit within the plurality of healthcare delivery units, or the subset thereof.

According to a tenth aspect of the invention, some examples of the method, apparatuses, and non-transitory computer-readable medium according to any of the first to ninth aspects may further include operations, features, means, or instructions for identifying a level of contribution of each of one or more new risk factors to the expected frequency of the at least one type of health outcome for at least one healthcare delivery unit within the plurality of healthcare delivery units, wherein the one or more new risk factors are associated with one or more emerging medical needs, and optionally, ranking the emerging medical needs based on the corresponding identified level of contribution to the expected frequency of the at least one type of health outcome.

According to an eleventh aspect of the invention, some examples of the method, apparatuses, and non-transitory computer-readable medium according to the ninth or tenth aspects of the invention may further include operations, features, means, or instructions for defining a target frequency of the at least one type of health outcome at a target healthcare delivery unit; computing patient-level target achievement probabilities at the target healthcare delivery unit based on the healthcare-delivery-unit-level impact metrics; aggregating the patient-level target achievement probabilities to compute an expected target achievement prevalence at the target healthcare delivery unit; and computing an expected margin of improvement for the target healthcare delivery unit by comparing the expected target achievement prevalence with a prevalence based on a distribution of the one or more non-modifiable risk factors observed in a standard population.

According to a twelfth aspect of the invention, some examples of the method, apparatuses, and non-transitory computer-readable medium according to the eleventh aspect of the invention may further include operations, features, means, or instructions for displaying, on a graphical user interface (GUI), the expected margin of improvement for the at least one modifiable risk factor for the target healthcare delivery unit; and/or for displaying on the GUI, guidance for addressing at least one unmet medical need for the target healthcare delivery unit, wherein the unmet medical need is associated with under-achievement in the at least one modifiable risk factor for which an actionable improvement margin has been discovered based on the computed expected margin of improvement; and/or for displaying on the GUI, for the target healthcare delivery unit, a sequence of features to modify with respect to successive risk reduction of the at least one type of health outcome, based on the computed expected margin of improvement.

According to a thirteenth aspect of the invention, some examples of the method, apparatuses, and non-transitory computer-readable medium according to the fifth aspect of the invention may further include operations, features, means, or instructions for creating risk models and adjusting the risk models based on newly configured model architecture and model parameters.

One or more specific exemplary embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions would be made to achieve the developers' specific goals, such as compliance with system-related and business-related constraints, which may vary from one implementation to another. Moreover, such a development effort would be a routine undertaking of design, fabrication, and manufacture for those of ordinary skill having the benefit of this disclosure.

The present invention provides techniques to produce standard and data-driven metrics to identify best performing healthcare delivery units, to rank priorities of interventions based on their relationship with patient-centered outcomes, and to assess credible margin of improvements for interventions.

The techniques further include ranking best performing healthcare delivery unit by disentangling the effect of modifiable (i.e. key performance indicators in a Continuous Quality Improvement program) and non-modifiable factors (i.e. case mix of personal characteristics such as age, sex, ethnicity and the likes) on patient-centered outcomes (i.e. mortality, hospitalization, quality of life, healthcare costs, etc.), ranking the contribution of intermediate modifiable clinical factors on patient-centered outcomes, comparing clinical target achievement intermediate modifiable clinical factors to an inter-clinical benchmark, and the clinical-user support by periodical recommendation of factors optimally suited to impact risks by modification within a specific clinic.

Furthermore, potential impact of interventions is anticipated by contrasting observed and expected rate of clinical target achievement based on inter-clinical benchmark comparisons.

Figure 2:
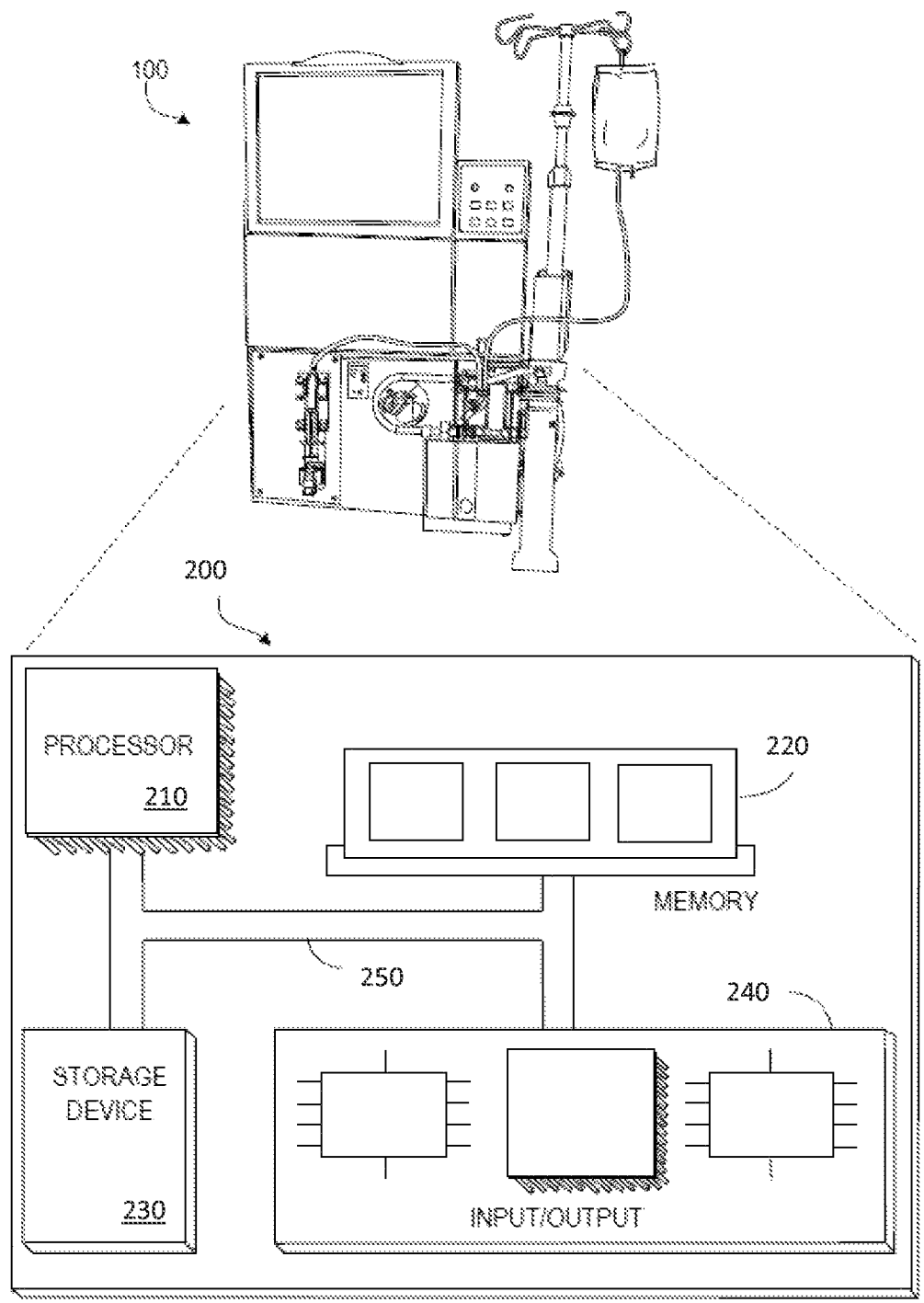
FIG. 2 depicts an exemplary computer system in connection with a hemodialysis system.
Figure 3:
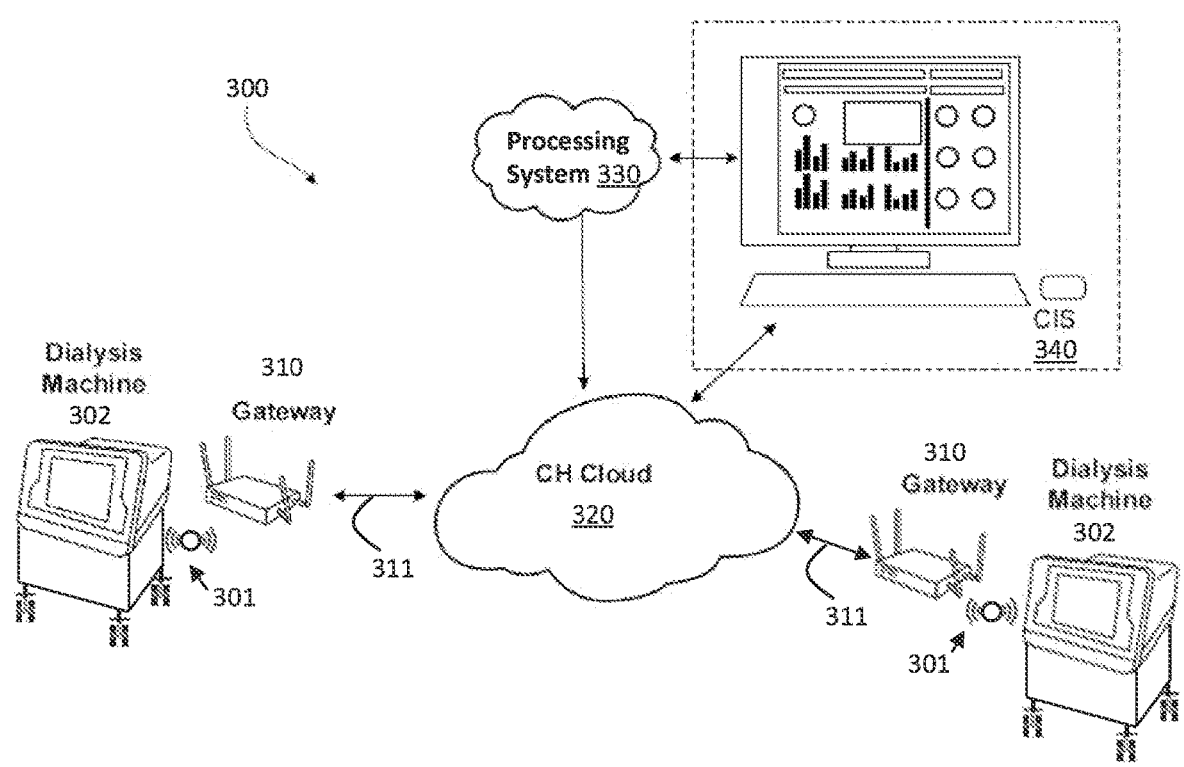
FIG. 3 depicts an example of a connected health (CH) system including a gateway device and a CH cloud service.

FIGS. 1-3 depict exemplary devices and exemplary environments through which exemplary embodiments of the present invention may be implemented. It will be appreciated that the devices and environments depicted in FIGS. 1-3 are merely examples, and that the invention is not limited thereto.

FIG. 1 shows a hemodialysis system 100, which is an example of a component of a healthcare delivery unit, such as a treatment system component of the healthcare delivery unit. The hemodialysis system 100 includes a hemodialysis machine 102 connected to a disposable blood component set 104 that partially forms a blood circuit. During hemodialysis treatment, an operator connects arterial and venous patient lines 106, 108 of the blood component set 104 to a patient. The blood component set 104 may include an air management device 112 that may include, for example, a venous drip chamber.

The blood component set 104 is secured to a module 130 attached to the front of the hemodialysis machine 102. The module 130 includes the blood pump 132 capable of circulating blood through the blood circuit. The module 130 also includes various other instruments capable of monitoring the blood flowing through the blood circuit. The module 130 includes a door that when closed, as shown in FIG. 1, cooperates with the front face of the module 130 to form a compartment that is sized and shaped to receive the blood component set 104.

The blood pump 132 is part of a blood pump module 134. The blood pump module 134 includes a display window, a start/stop key, an up key, a down key, a level adjust key, and an arterial pressure port. The display window displays the blood flow rate setting during blood pump operation. The start/stop key starts and stops the blood pump 132. The up and down keys increase and decrease the speed of the blood pump 132. The level adjust key raises a level of fluid in a drip chamber.

The hemodialysis machine 102 further includes a dialysate circuit formed by the dialyzer 110, various other dialysate components, and dialysate lines connected to the hemodialysis machine 102. Many of these dialysate components and dialysate lines are inside the housing 103 of the hemodialysis machine 102. During treatment, while the blood pump 132 circulates blood through the blood circuit, dialysate pumps circulate dialysate through the dialysate circuit.

A drain line 128 and an ultrafiltration line 129 extend from the hemodialysis machine 102. The drain line 128 and the ultrafiltration line 129 are fluidly connected to the various dialysate components and dialysate lines inside the housing 103 of the hemodialysis machine 102 that form part of the dialysate circuit. During hemodialysis, the dialysate supply line carries fresh dialysate to the portion of the dialysate circuit located inside the hemodialysis machine 102. As noted above, the fresh dialysate is circulated through various dialysate lines and dialysate components, including the dialyzer 110, that form the dialysate circuit. As the dialysate passes through the dialyzer 110, it collects toxins from the patient's blood. The resulting spent dialysate is carried from the dialysate circuit to a drain via the drain line 128. When ultrafiltration is performed during treatment, a combination of spent dialysate (described below) and excess fluid drawn from the patient is carried to the drain via the ultrafiltration line 129.

The dialyzer 110 serves as a filter for the patient's blood. The dialysate passes through the dialyzer 110 along with the blood, as described above. A semi-permeable structure (e.g., a semi-permeable membrane and/or semi-permeable microtubes) within the dialyzer 110 separates blood and dialysate passing through the dialyzer 110. This arrangement allows the dialysate to collect toxins from the patient's blood. The filtered blood exiting the dialyzer 110 is returned to the patient. The dialysate exiting the dialyzer 110 includes toxins removed from the blood and is commonly referred to as "spent dialysate." The spent dialysate is routed from the dialyzer 110 to a drain.

A drug pump 192 also extends from the front of the hemodialysis machine 102. The drug pump 192 is a syringe pump that includes a clamping mechanism configured to retain a syringe 178 of the blood component set 104. The drug pump 192 also includes a stepper motor configured to move the plunger of the syringe 178 along the axis of the syringe 178. A shaft of the stepper motor is secured to the plunger in a manner such that when the stepper motor is operated in a first direction, the shaft forces the plunger into the syringe, and when operated in a second direction, the shaft pulls the plunger out of the syringe 178. The drug pump 192 can thus be used to inject a liquid drug (e.g., heparin) from the syringe 178 into the blood circuit via a drug delivery line 174 during use, or to draw liquid from the blood circuit into the syringe 178 via the drug delivery line 174 during use.

The hemodialysis machine 102 includes a user interface with input devices such as a touch screen 118 and a control panel 120. The touch screen 118 and the control panel 120 allow the operator to input various different treatment parameters to the hemodialysis machine 102 and to otherwise control the hemodialysis machine 102. The touch screen 118 displays information to the operator of the hemodialysis system 100.

The hemodialysis machine 102 also includes a control unit 101 (e.g., a processor) configured to receive signals from and transmit signals to the touch screen 118 and the control panel 120. The control unit 101 can control the operating parameters of the hemodialysis machine 102, for example, based at least in part on the signals received by the touch screen 118 and the control panel 120. The hemodialysis machine 102 may also include a communication unit 105 that may be provided for wireless communication with a remote device, as further described in detail elsewhere herein, and may be communicatively coupled with the control unit 101.

It will be appreciated that the hemodialysis system 100 is just one example of a treatment system component of a healthcare delivery unit. Exemplary embodiments of the invention are also applicable to other types of components of a health care delivery unit, including peritoneal dialysis machines or other types of treatment machines, peripheral component devices of a treatment system, and/or components of other types of healthcare systems, including clinical information systems.

FIG. 2 is a block diagram of an example computer system 200 illustrated in connection with the dialysis machine 100. For example, the control unit 101 discussed above could be an example of the system 200 described here. The system 200 includes a processor 210, a memory 220, a storage device 230, and an input/output device 240. Each of the components 210, 220, 230, and 240 can be interconnected, for example, using a system bus 250. The processor 210 is capable of processing instructions for execution within the system 200. The processor 210 can be a single-threaded processor, a multi-threaded processor, and/or other computer. The processor 210 is capable of processing instructions stored in the memory 220 or on the storage device 230. The memory 220 stores information within the system 200. In some implementations, the memory 220 is a computer-readable medium. The memory 220 can, for example, be a volatile memory unit or a non-volatile memory unit.

The storage device 230 is capable of providing mass storage for the system 200. In some implementations, the storage device 230 is a non-transitory computer-readable medium. The storage device 230 can include, for example, a hard disk device, an optical disk device, a solid-state drive, a flash drive, magnetic tape, or some other large capacity storage device. The storage device 230 may alternatively be a cloud storage device, e.g., a logical storage device including multiple physical storage devices distributed on a network and accessed using a network. In some implementations, the information stored on the memory 220 can also or instead be stored on the storage device 230.

The input/output device 240 provides input/output operations for the system 200. In some implementations, the input/output device 240 includes one or more of network interface devices (e.g., an Ethernet card), a serial communication device (e.g., an RS-232 10 port), and/or a wireless interface device (e.g., a short-range wireless communication device, an 802.11 card, a wireless modem (3G, 4G, 5G)). In some implementations, the input/output device 240 includes driver devices configured to receive input data and send output data to other input/output devices, e.g., a keyboard, a printer, and display devices (such as the touch screen display 118). In some implementations, mobile computing devices, mobile communication devices, and other devices are used. The input/output device 240 may further include the communication component 105 that is discussed in more detail elsewhere herein.

In some implementations, the system 200 is a microcontroller. A microcontroller is a device that contains multiple elements of a computer system in a single electronics package. For example, the single electronics package could contain the processor 210, the memory 220, the storage device 230, and input/output devices 240.

FIG. 3 is a schematic illustration showing an example of a connected health (CH) system 300 that may include, among other things, gateway device(s) 310 and a CH cloud service 320. The CH system 300 may provide for communication and/or connectivity of one or more dialysis machines 302 (which may include multiple dialysis machines from a single clinic and/or multiple dialysis machines across multiple clinics). The one or more dialysis machines 302 may be similar to one or more of the dialysis machines discussed elsewhere herein, such as the dialysis machine 102, and/or may include a different type of dialysis machine, such as a home HD machine and/or a peritoneal dialysis (PD) machine. Via the CH system 300, the dialysis machine(s) 302 may be connected to internal and external networks, including with remote servers and/or entities. The gateway device(s) 310 may serve as a communication device facilitating communication among components of the CH system 300. The CH cloud 320 may be a cloud-based application or service (e.g. Software as a Service) implementation that serves as a communication pipeline that facilitates the transfer of data among components of the CH system 300 via connections to a network such as the Internet. A processing system 330 may be a server and/or cloud-based system that processes, compatibility checks and/or formats medical information, including prescription information generated at a clinical information system (CIS) 340 of a clinic or hospital, in connection with data transmission operations of the CH system 300. In situations involving a large amount of data being collected from multiple dialysis machines 302, the processing system 330 and/or the CH cloud 320 may include a big data analytics system, including for example, a big data warehouse with one or more clusters of computing nodes. The CH system 300 may include appropriate encryption and data security mechanisms.

In various embodiments, gateway device 310 is in communication with dialysis machine 302 via wireless connection 301, which may be done over a short range network, such as Bluetooth, Wi-Fi and/or other appropriate type of local or short range wireless connection. Gateway 310 may also be in connection with CH cloud 310 via external network connection 311 (e.g., via the Internet). Gateway device 310 is configured to transmit/receive data to/from the CH cloud 320 and transmit/receive data to/from dialysis machine 302. In various implementations, dialysis machine 302 may poll CH cloud 320 for available files (e.g., via gateway device 310), and dialysis machine 302 may temporarily store available files for processing.

Figure 4A:
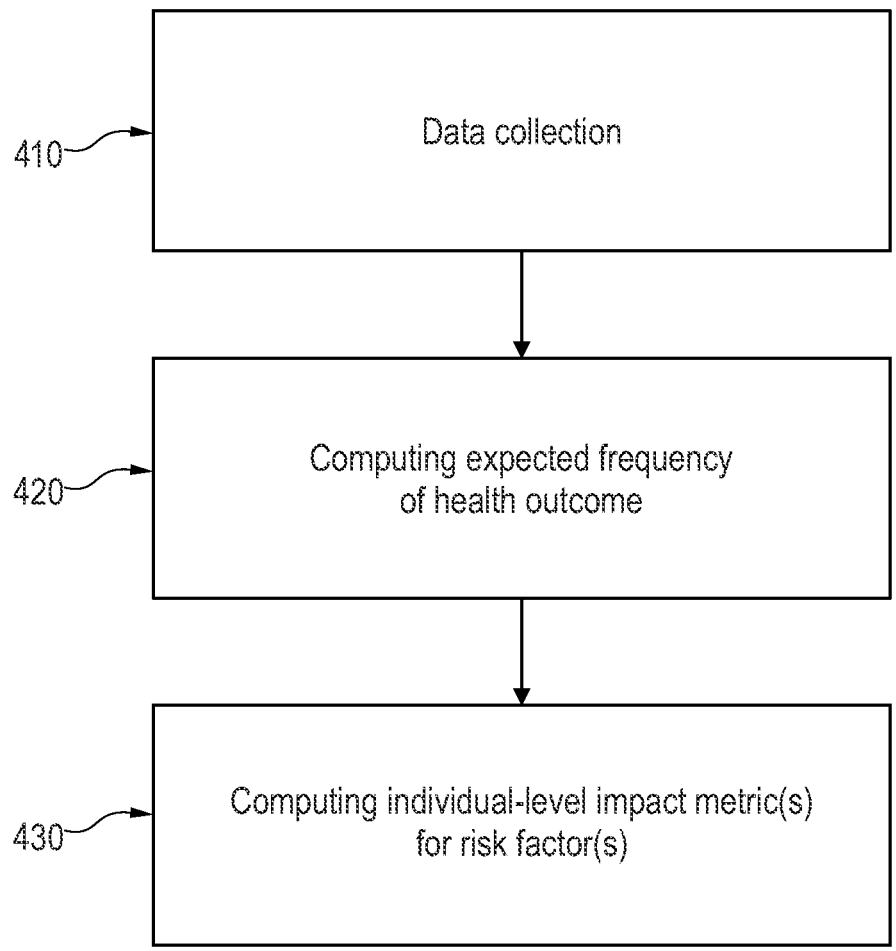
FIG. 4a depicts a flowchart of a computer-implemented method in accordance with an embodiment of the invention.

FIG. 4a provides a flowchart of a computer-implemented method in accordance with an embodiment of the invention.

The method in accordance with an embodiment of the invention includes collecting data from different data sources related to the plurality of healthcare delivery units, shown as step 410; computing, based on the collected data, for individual patients associated with any one of the plurality of healthcare delivery units, an expected frequency of at least one type of health outcome for each of the individual patients, shown as step 420; and generalizing the computed expected frequencies of the at least one type of health outcome for the individual patients into one or more individual-level impact metrics associated with one or more risk factors for the at least one type of health outcome, wherein the one or more risk factors comprise one or more modifiable risk factors and one or more un-modifiable risk factors, shown as step 430.

The collected data can include e.g. patient information (such as age, sex, ethnicity, etc.), medical history (such as conditions, their progress, therapies, etc.), physiological measurement results (such as pulse, temperature, body liquid content concentrations, blood pressure, etc.), treatment parameters (particularly dialysis treatment settings, drug dosing, etc.), clinical attributes (such as locality, size, staff size, resources, therapy availability, etc.). All patients' data can be classified as modifiable and non-modifiable risk factors based on substantive medical knowledge abstracted from medical literature and expert opinion which may inform a Continuous Quality Improvement (CQI) program. The application can be customized to accommodate the objective and key performance indicator architecture of any CQI program in healthcare.

The data sources can be medical files, electronic health records, clinical guidelines, medical databases, literature, treatment devices, direct measurements, drug prescription, manual input, etc. When information is collected from medical literature, information is processed into model weights as described in the publication WO 2019/072692 A1.

The type of health outcome can be related to e.g. mortality, hospitalization, quality of life, healthcare costs, etc.

Figure 4B:
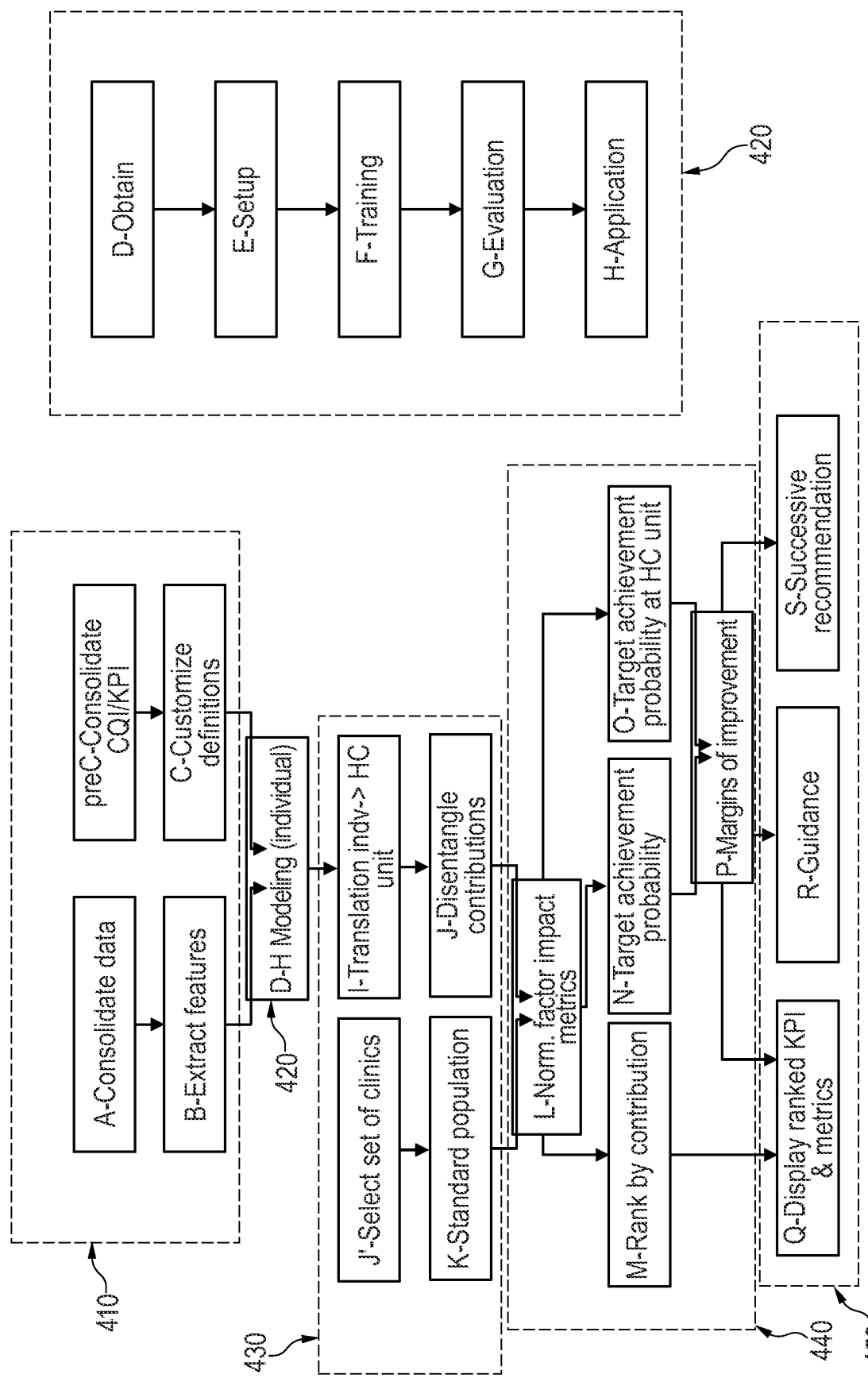
FIG. 4b depicts a flowchart of a computer-implemented method in accordance with an embodiment of the invention.

FIG. 4b provides a flowchart of a computer-implemented method in accordance with an embodiment of the invention.

In this embodiment, the method may comprise consolidating data from the different data sources, shown as step A.

Data consolidation (i.e. aggregation) can vary in terms of sources, types/formats, media, and interfacing means and it can be spatially and temporally distributed. Merging of several data sets can be used to generate new data sets with or without (metadata) measurable real-world correspondence. Often, non-clinical data is combined with clinical data to generate new data sets with clinical use cases. New data obtained in this way can transcend limitations of the attributes of the originally underlying data by analytical extrapolation. This allows to correlate original, e.g. currently measured from one user group, clinical data to metadata with indications of progression of this data and/or their expectation for another clinic/user group.

Optionally, the method may comprise extracting a set of features from the collected data, shown as step B.

The extracted features can contain socio-demographic characters, health conditions, laboratory tests, instrumental investigations, progressions stages, therapy efficiency (e.g. Kt/V, hydration status, bone-metabolism markers, anemia markers, etc.), etc. The features can be obtained as results of several logical and mathematical functions on the collected data. At all times, derived features are representative or indicative of concrete underlying health-related measurables. Operative definitions adopted in the modeling strategy reproduce CQI architecture and are fully customizable to any CQI program in healthcare. From those features, features concurring to Key Performance Indicator (KPI) definitions are deemed susceptive to modifications; all other features are deemed non-modifiable.

Optionally, the method may comprise customizing operative definitions based on a Continuous Quality Improvements (CQI) architecture and Key Performance Index (KPI) definition, shown as step C. Operative definitions are the sum of algorithmic rules of CQI architectures and KPI definitions. For example, operative definitions would be given by i) equations, parameters, variables, constants for CQI,
ii) equations, parameters, variables, constants for KPI, and/or
iii) algorithmic simplifications, e.g. CQI1=CQI(KPI(data (t)))→CQI1=CQI(t).

A CQI architecture is defined by the (temporal) dynamics of underlying data (features) and KPIs, one or more (time-dependent) parametric equations and the parametric weights, for example t<t1: CQI=a*data1($t$)+b*KPI1 (t); t>t1: CQI=c*KPI1(t). The parameters and/or parametric weights (here, the a, b and c in the example equation) are usually defined by clinical guidelines.

A KPI is an algorithmic derivation from a subset of measurable data/data features. It is defined by the ingoing data subset, one or more parametric equations, and weight parameters to certain features within the equations. Standard pre-defined assumptions may be used for certain parameters if they cannot be derived from the underlying data. For example, a KPI can be defined as KPI=a*data1+b data2+c, which is a linear equation, where a and b are measurable parameters, and c is a pre-defined parameter.

Further, a preC step can be performed before step C to consolidate CQI/KPI.

Optionally, the method may comprise obtaining one or more analytical models suitable for a set of features extracted from the data and for the at least one type of health outcome, shown as step D.

The one or more analytical models may comprise an exponential distribution family, a derivative of an exponential distribution family, a Bayesian network, an artificial neural network, and/or a non-parametric method. The non-parametric method may comprise a decision tree, k-Nearest neighbors, and/or a support vector machine.

The one or more analytical models can be e.g. obtained based on model fit metrics. Model fit metrics reflect how "suitable" a model is for describing features extracted from the data. This can be defined by a deviation between data features and model over the range of the data (and beyond). A "decision" to consider a model sufficiently suitable is made by defining thresholds for acceptable deviation.

Further, the one or more analytical models can be e.g. obtained based on a prediction model. The model becomes predictive when it exceeds the range of the ingoing data features. The deviation of the prediction scales with distance to the covered data range. A decision is made by defining thresholds to acceptable deviation with regard to required distance to covered data range.

Optionally, the method may comprise setting up a model architecture based on a Continuous Quality Improvements (CQI) structure, shown as step E. The model architecture is defined by a set of equations, ingoing fixed and variable parameters, ranges and starting values for variable parameters. Types of equations, variables and their dependencies are reflective of variables and their dependencies of one or more CQI structures. Parameter limits of the model variables can be fixed by the CQI structure.

Optionally, the method may comprise training n+m risk models based on the obtained one or more analytical models and the model architecture, wherein n represents the number of the at least one type of health outcome and m represents the number of the one or more modifiable risk factors.

Parameters informing individual level model predictions toward patient-centered outcomes are constructed by a method described in WO 2019/072692 A1. Modeling strategy includes simultaneous probabilistic prediction of one or more patient-centered outcomes (i.e. mortality, hospitalization, healthcare cost, quality of life, etc.) by modifiable and non-modifiable risk factors, and concurrent prediction of expected target achievement for all modifiable factors. Therefore, the method incorporates n+m concurrent models, where n represents the number of patient-centered outcomes considered and m represents the number of modifiable factors (e.g. corresponding to KPI) considered in the target CQI program.

Optionally, the method may comprise evaluating calibration and accuracy of the n+m risk models in a test set, shown as step G.

Optionally, the method may comprise applying the one or more analytical models or the n+m risk models to the collected data to predict the expected frequency for the at least one type of health outcome for the individual patients, shown as step H.

Optionally, the method may comprise applying aggregation rules to translate said computed expected frequencies for the individual patients into a healthcare-delivery-unit-level expected frequency for each of the healthcare delivery units, shown as step I; and identifying a level of contribution of each of the one or more risk factors to the healthcare-delivery-unit-level expected frequency of the at least one type of health outcome for each of the healthcare delivery units within the plurality of healthcare delivery units, or a benchmarking subset thereof, and computing the one or more individual-level impact metrics associated with the one or more risk factors based on the identified level of contribution, shown as step J.

Optionally, the method may comprise constructing, for each healthcare delivery unit within the plurality of healthcare delivery units, or a subset thereof, a standard population scenario to estimate, based on the one or more individual-level impact metrics, a modified expected frequency of the at least one type of health outcome that would be expected if a distribution of the one or more non-modifiable risk factors was fixed to a distribution observed in the standard population, shown as step K. Further, the method may comprise ranking the healthcare delivery units within the plurality of healthcare delivery units, or the subset thereof, based on the estimated modified expected frequencies of the at least one type of health outcome that would be expected in the standard population.

In an embodiment, the method may comprise aggregating the one or more individual-level impact metrics associated with the one or more risk factors for each healthcare delivery unit within the plurality of healthcare delivery units, or a subset thereof; and normalizing said one or more individual-level impact metrics into a healthcare-delivery-unit-level impact metric for each healthcare delivery unit within the plurality of healthcare delivery units, or the subset thereof, shown as step L of step 440.

The healthcare-delivery-unit-level may be a level associated with healthcare delivery units, healthcare authority units, regional administration units, country healthcare system units, and etc.

Optionally, the method may comprise identifying a level of contribution of each of one or more new risk factors to the expected frequency of the at least one type of health outcome for at least one healthcare delivery unit within the plurality of healthcare delivery units. The one or more new risk factors are associated with one or more emerging medical needs. Further, the method may comprise ranking the emerging medical needs based on the corresponding identified level of contribution to the expected frequency of the at least one type of health outcome, shown as step M.

In an embodiment, the method may comprise, for at least one of the one or more modifiable risk factors, defining a target frequency of the at least one type of health outcome at a target healthcare delivery unit; computing patient-level target achievement probabilities at the target healthcare delivery unit based on the healthcare-delivery-unit-level impact metrics, shown as step N; aggregating the patient-level target achievement probabilities to compute an expected target achievement prevalence at the target healthcare delivery unit, shown as step O; and computing an expected margin of improvement for the target healthcare delivery unit by comparing the expected target achievement prevalence with a prevalence based on a distribution of the one or more non-modifiable risk factors observed in a standard population, shown as step P. Patient-level targets are computed by normalizing the standard healthcare-unit targets (i.e. with standard distribution of non-modifiable factors) to non-modifiable factors of the patient within the target healthcare unit. The patient-level target achievement probability is the result of a modelled prediction with ingoing individual patient data and target achievement as outcome.

Further, optionally, the method may comprise displaying, on a graphical user interface (GUI), the expected margin of improvement for the at least one modifiable risk factor for the target healthcare delivery unit, shown as step Q of step 450; and/or outputting, on a graphical user interface (GUI), guidance for addressing at least one unmet medical need for the target healthcare delivery unit, wherein the unmet medical need is associated with under-achievement in the at least one modifiable risk factor for which an actionable improvement margin has been discovered based on the computed expected margin of improvement, shown as step R; and/or outputting, for the target healthcare delivery unit, a sequence of features to modify with respect to successive risk reduction of the at least one type of health outcome, based on the computed expected margin of improvement, shown as step S.

In another embodiment, the method is executed by software by controlling the execution of individual steps of network-connected components of a distributed system of databases, medical treatment and monitoring devices, computing units, and display/input means (see, for example, FIGS. 1-3). Suitable databases include medical health records, clinical/regional/(inter)national patient databases, medical literature registries, and others. In the case of treatment devices, networked dialysis machines, for example, but also ventilators or infusion devices are particularly suitable. Monitoring devices can be implemented as part of the treatment devices or separately, e.g., as a clinical "dashboard." Also, the display/input means may be parts of other system components, e.g., operating screen of the treatment devices, or implemented in a separate user device, e.g., tablet/smartphone.

In another embodiment, the steps of the method are executed in a cloud platform and user interaction (input/output) is enabled via web browser interface to the cloud platform. User devices are then all common web-enabled devices.

Figure 5:
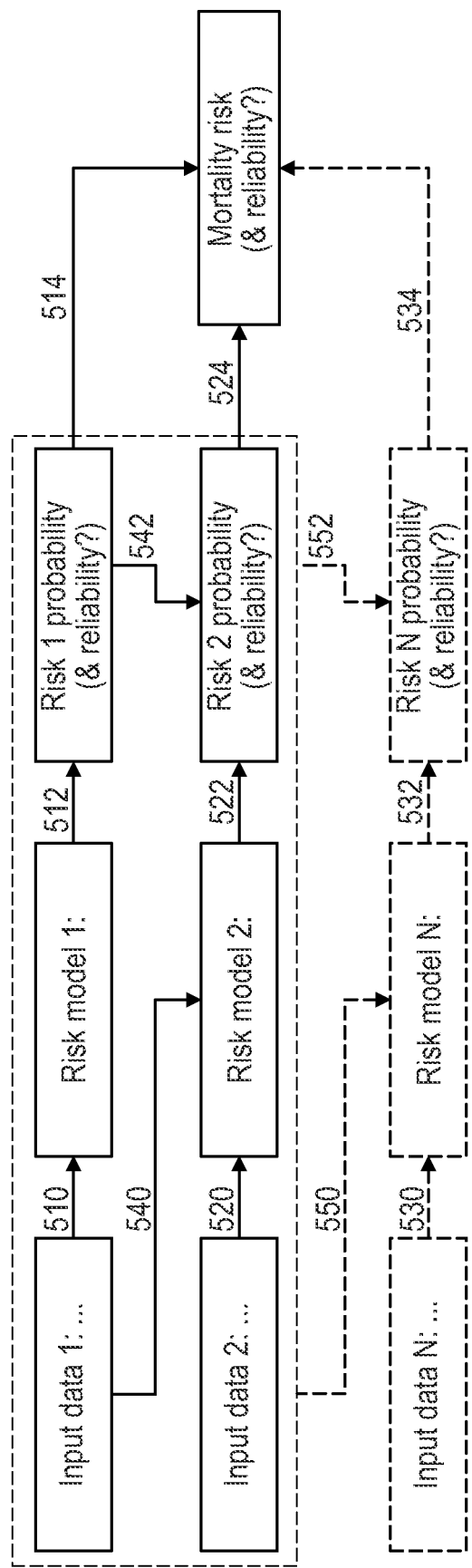
FIG. 5 depicts a flowchart showing an example of integration of additional data/risk models into an available system.

FIG. 5 is a flowchart showing an example of integration of additional data/risk models into an available system.

Integration of additional data/risk models into the available system can affect parameters of available risk models (& resulting risk probabilities). Missing data parts for newly integrated data can be extrapolated from available data. Newly integrated risk models can be affected by already available risk models and underlying data, vice versa.

As shown in FIG. 5, the production (510, 520, 530) of individual risk models in terms of their architecture and parameter configuration suitable to predict (512, 522, 532) certain risk probabilities. A combination of resulting risk predictions can be employed to calculate (514, 524, 534) a certain health outcome. Risk model configurations obtained from one set of input data (e.g. input data 1) can be employed (540) for other input data (e.g. input data 2) not underlying the configuration process (510), omitting repetitive configuration process (e.g. the process shown as 520). For a sufficient set of input data 1, 2 resulting risk models 1,2 can be sufficient to construct (550) any risk model N, reflective of any input data N, without performing an additional model configuration step (530). For certain risk probabilities with interdependence, Risk 2 probability can be derived from Risk 1 probability (542). For a sufficient set of input data 1, 2, resulting Risk 1,2 probabilities can be sufficient to derive (552) any Risk N probability, reflective of any input data N, without performing an additional probability prediction step (552).

Figure 6:
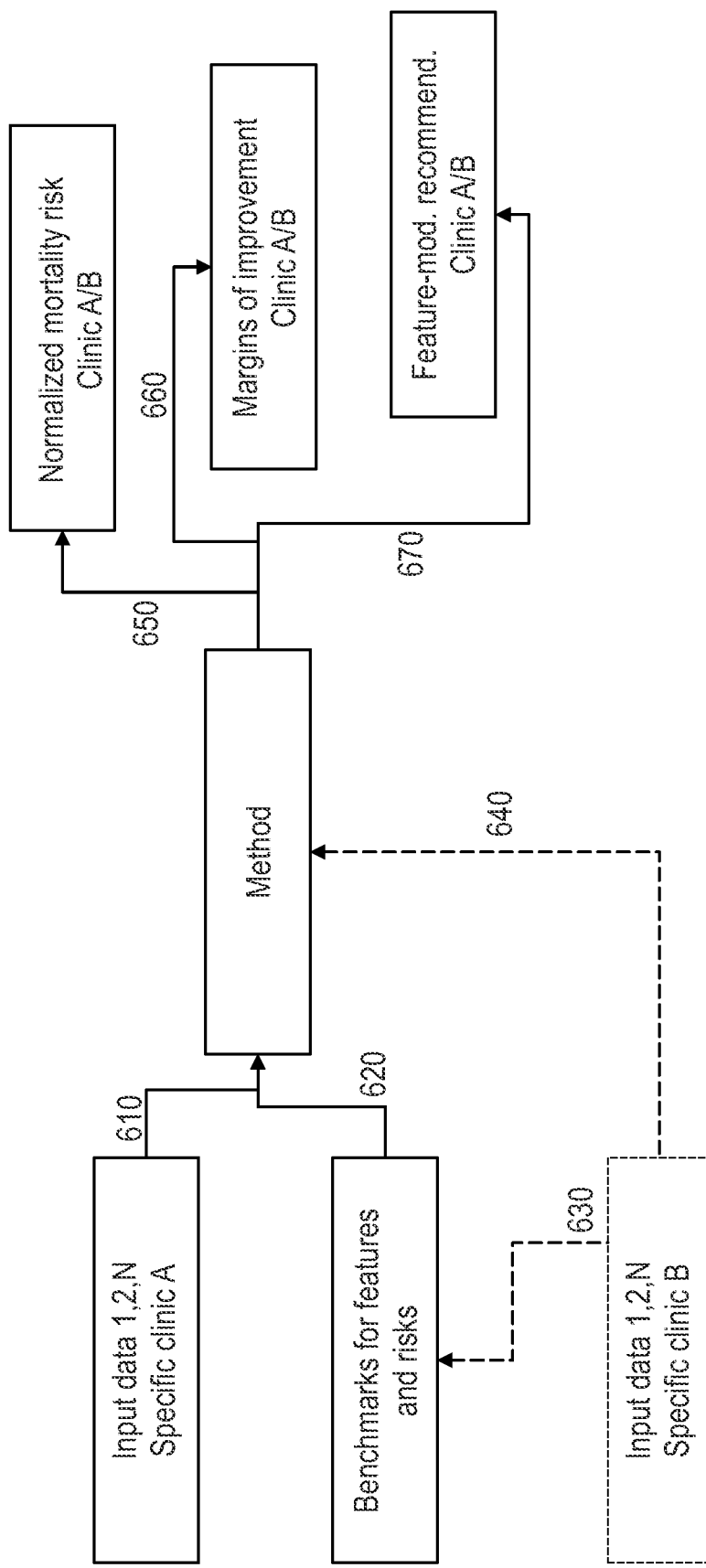
FIG. 6 depicts a flowchart showing an example of analysis of a newly integrated healthcare unit/clinic with respect to benchmarks.

FIG. 6 is a flowchart showing an example of analysis of a newly integrated healthcare unit/clinic with respect to benchmarks.

Newly integrated healthcare unit/clinic is analyzed with respect to benchmarks(s) based on already integrated healthcare unit data but can (optionally) contribute to benchmarks (and models used in the method); i.e., the method's models are evolving with additional data sources.

As shown in FIG. 6, input data 1,2,N(A) of a specific clinic A is employed (610) within the method with optional contributions of benchmarks for features and risks to produce the outcomes of a health outcome probability (650), margins of improvements (660) and recommendations (670) for the specific clinic A. Integration of another healthcare unit B with respective input data 1,2,N(B) is performed by employing (640) its data within the method to produce outcomes respective to clinic B. Additionally, input data of clinic B can optionally contribute (630) to benchmark values. This can result in different outcomes for clinic A depending on whether newly integrated data of clinic B is contributing (630) to benchmark values. This can also result in different outcomes for clinic B depending on whether newly integrated data is contributing (630) to benchmark values.

The output is displayed on a graphical user interface (GUI), e.g. on a screen to guide the user. The GUI displays for example the following information:

For single/region of/benchmark for clinic(s): standardized health outcome risk score;
Risk factors in clinic: current & target w.r.t. benchmark;
Distribution of risk factors in clinic: observed & predicted;
Correlation of risk factors and outcomes & comparison to other clinic(s), regions, benchmark;
Development of above over time→(evidence on) quality improvement;
Best-in-comparison clinic→examples for best clinical practice.

Figure 7:
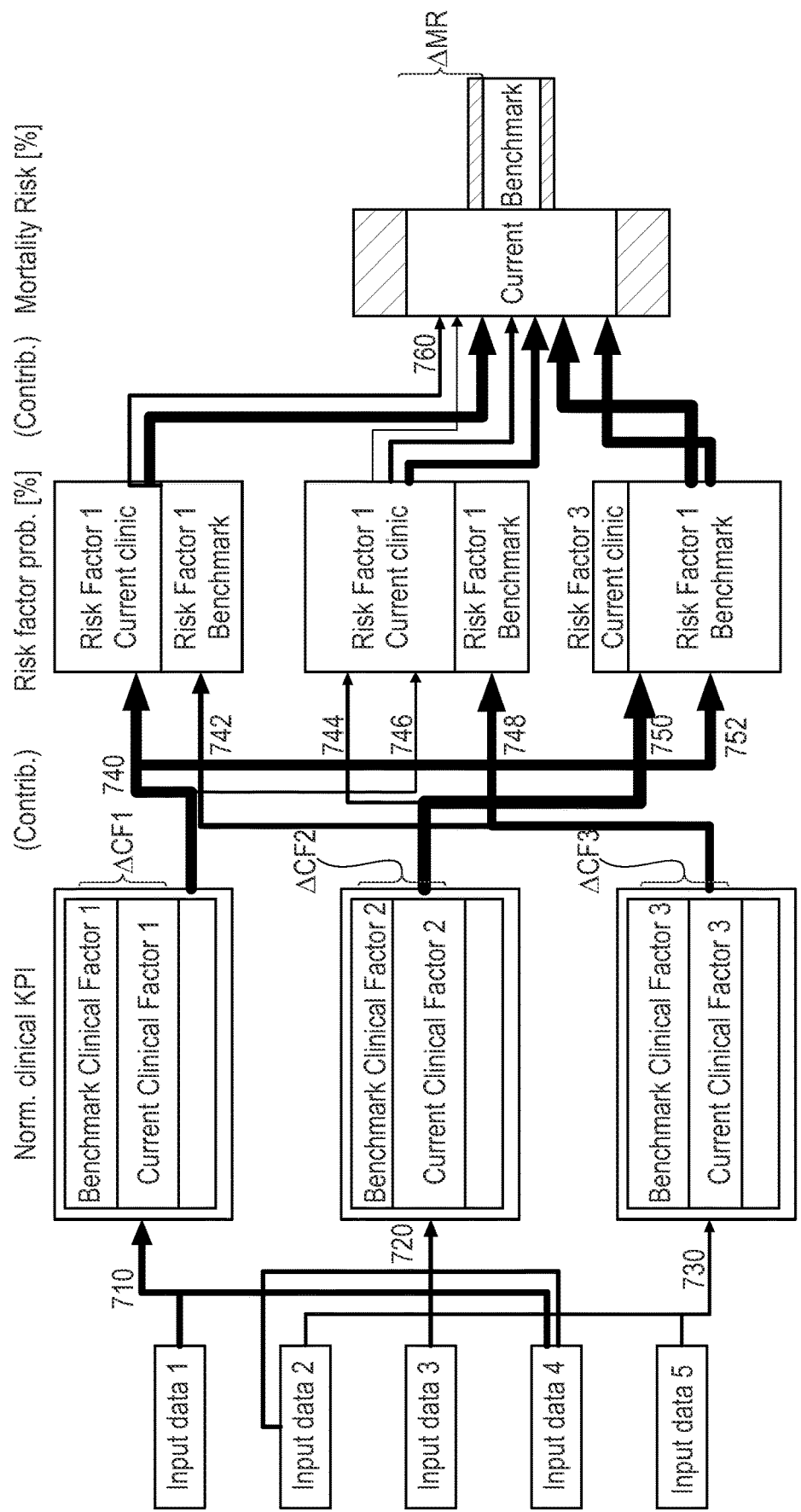
FIG. 7 depicts a schematic overview of relationships between clinical factors and health risks.

FIG. 7 shows a schematic overview of relationships between clinical factors and health risks, wherein MR=mortality risk, CF=clinical factor, ΔCF, ΔMR=difference to benchmark.

Data and calculated (meta-) indices (Clinical Factor/KPI, Risk Factor, Benchmark) are displayed by flow and strength, wherein contribution to index total corresponds to thickness of flow arrow. Further, the flows and arrows can be shown in different colors.

As shown in FIG. 7, input data 1,2,3,4,5 of different origins and/or types can be differently combined to contribute (710, 720, 730) to certain clinical factors with respective resulting deviations ΔCF1, 2, 3 of current clinical factors 1, 2, 3 to benchmark values 1, 2, 3. Further, the different contributions (710, 720, 730) can be displayed in different colors (i.e. the corresponding flows and arrows for the contributions 710, 720, 730 can be displayed in different colors, respectively).

Contributions of certain clinical factors 1, 2, 3 to certain risk factors 1, 2, 3 can be of different combinations and strengths (740, 742, 744, 746, 748, 750, 752). Further, corresponding flows and arrows for the contributions 740, 742, 744, 746, 748, 750, 752 can be displayed in different colors. For example, the contributions 740, 746 and 752, which are related to "Clinical Factor 1", can be displayed in a first color; the contributions 744 and 750, which are related to "Clinical Factor 2", can be displayed in a second color; and the contributions 742 and 748, which are related to "Clinical Factor 3", can be displayed in a third color.

The health outcome probability, here mortality risk, results from several respective risk factors with different respective contributions (760). Deviations to benchmark values can be calculated for clinical factors (ΔCF1, 2, 3), at the level of risk factors and at the level of the health outcome probability (ΔMR).

Figure 8:
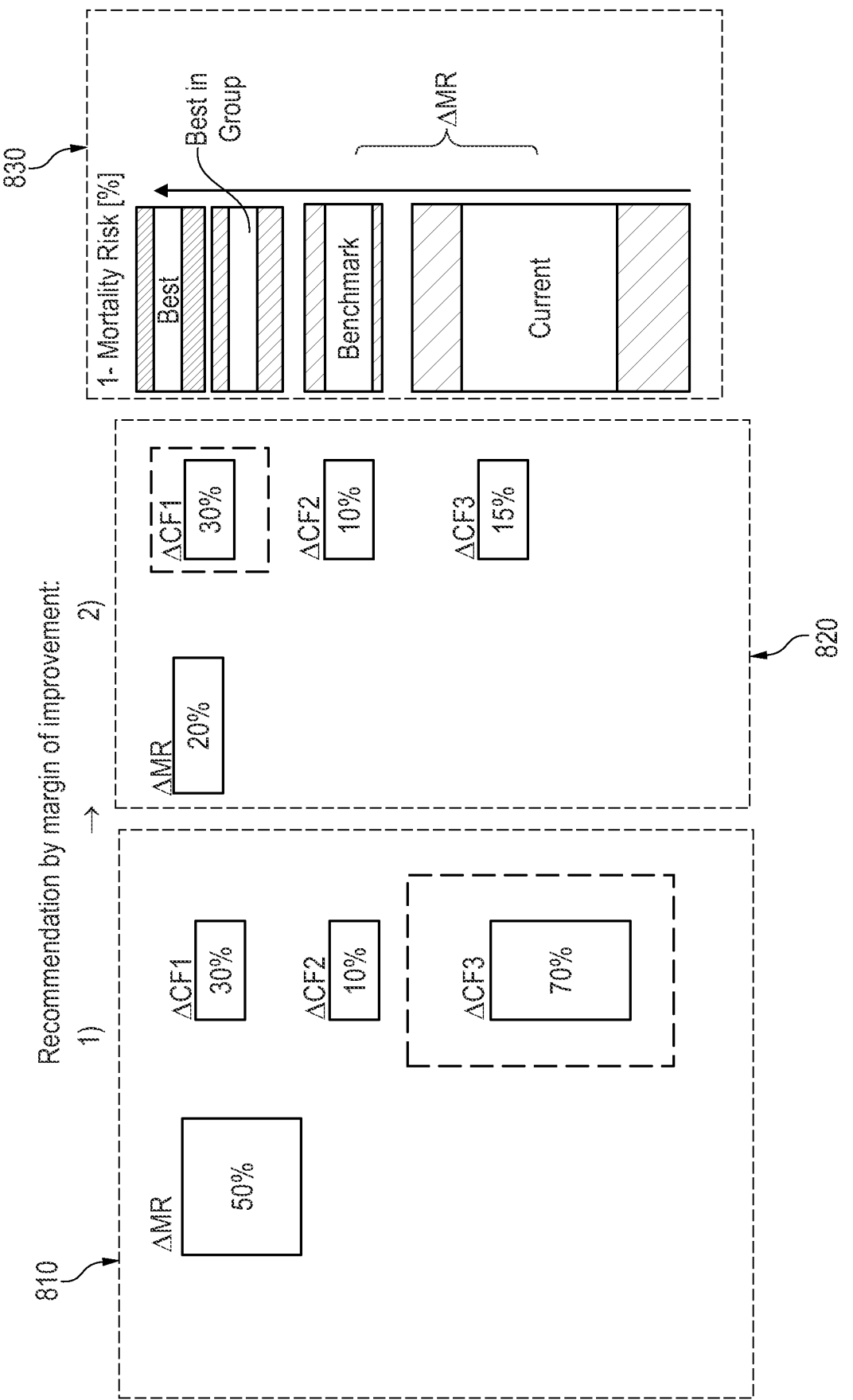
FIG. 8 depicts an example result for risk reduction based on clinical factors.
Figure 9:
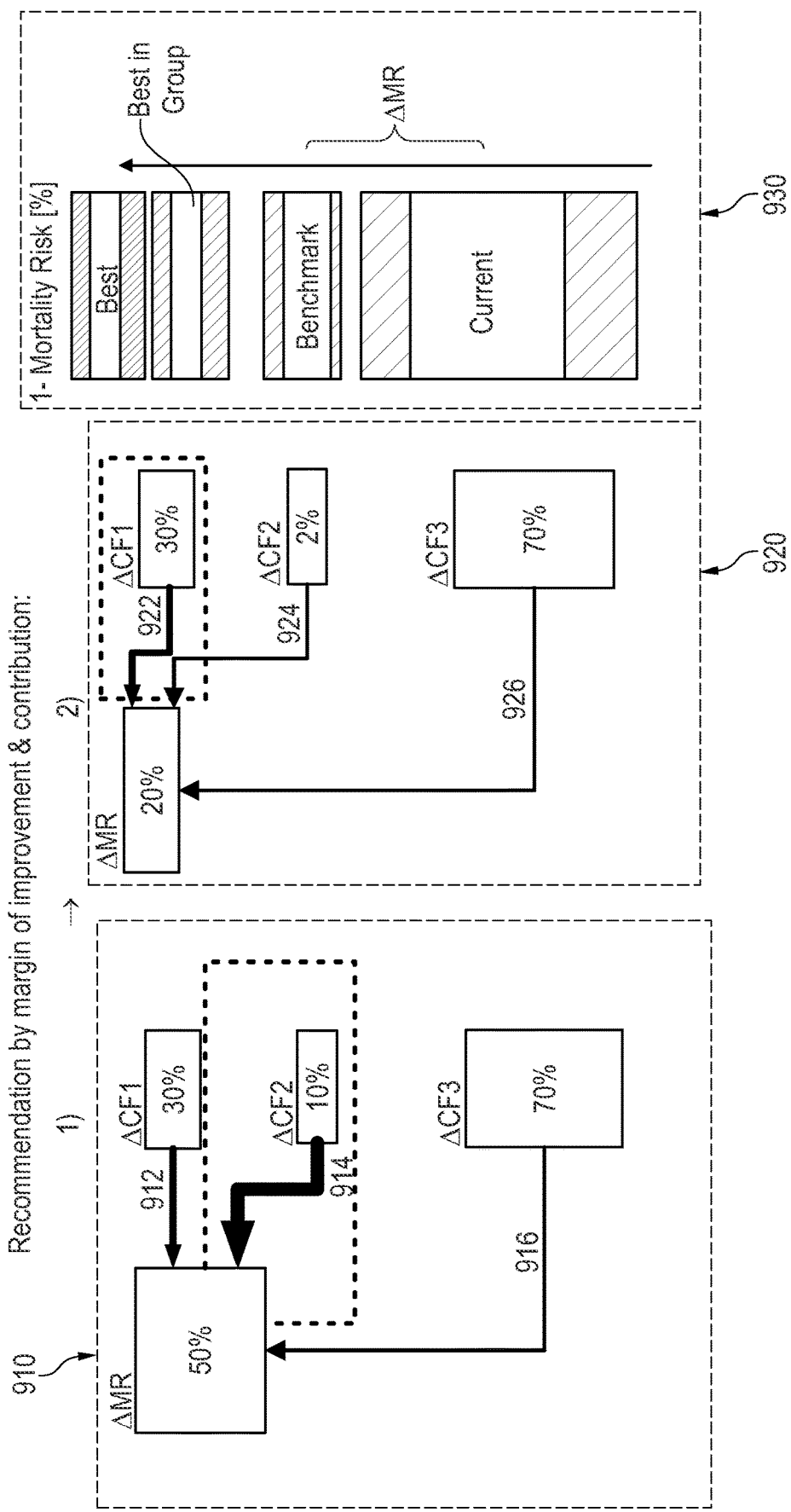
FIG. 9 depicts an example result for risk reduction based on clinical factors and benchmarks.

There are different options for bases of displayed recommendation. FIG. 8 shows an example of a first option, wherein the recommendation is displayed by margin of improvement (of contributing clinical factors). FIG. 9 shows an example of a second option, wherein the recommendation is displayed by degree of contribution and superposition of contribution and margin.

As shown in FIG. 8, at a certain first stage 1 (810) the margin of improvement for health outcome ΔMR, as defined by with respect to a selectable benchmark (830), is displayed with margins of improvement for clinical factors ΔCF1, ΔCF2, ΔCF3. CF3 with the highest margin of improvement ΔCF3 is recommended to be addressed. At a certain second stage 2 (820), e.g. following the addressing of recommended factor at the earlier stage 1, ΔMR is reduced and the recommendation is changed to a different factor CF1 with highest margin of improvement ΔCF1.

As shown in FIG. 9, at a certain first stage 1 (910) the margin of improvement for health outcome ΔMR, as defined by with respect to a selectable benchmark (930), is displayed with margins of improvement for clinical factors ΔCF1, ΔCF2, ΔCF3 and their respective contributions 912, 914, 916 to the health outcome. Similar as in FIG. 7, the contributions 912, 914, 916 can be displayed with different colors and thicknesses.

CF3 shows the highest margin of improvement ΔCF3, i.e. 70%. But CF 2 shows the highest contribution to the health outcome (914), i.e. the flow of contribution 914 is displayed as thicker than the flows of contributions 912 and 916. Therefore, CF2 is recommended to be addressed. At a certain second stage 2 (920), e.g. following the addressing of recommended factor at the earlier stage 1, ΔMR is reduced and the recommendation is changed to a different factor CF1 with highest contribution to the health outcome (922).

Figure 10:
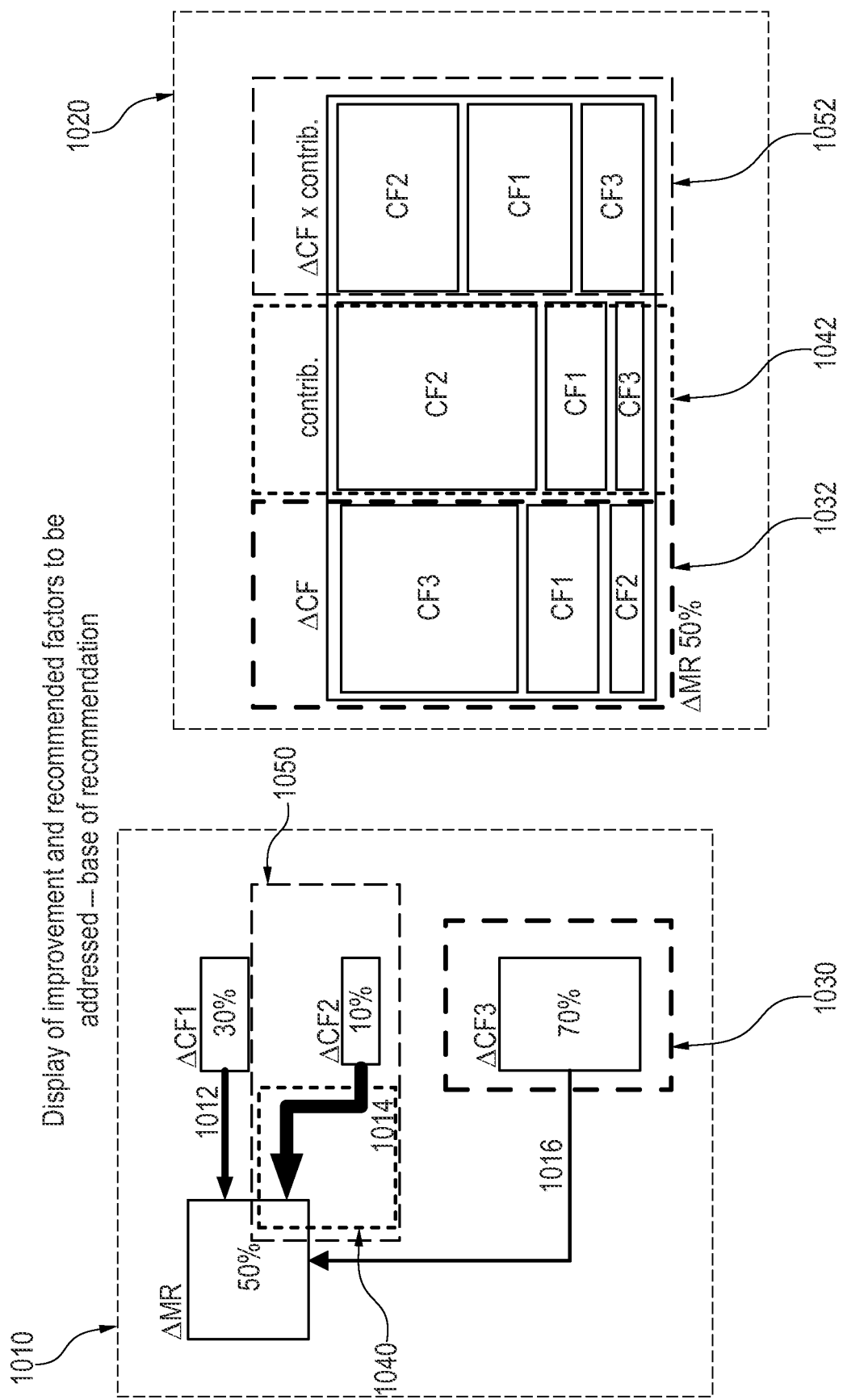
FIG. 10 depicts a comparison of results as a function of a (selectable) recommendation basis.

FIG. 10 shows a comparison of results as a function of a (selectable) recommendation basis. As shown in FIG. 10, recommendation results (1020) are shown as a function of a (selectable) recommendation basis (1032, 1042, 1052). The basis of recommendation can be selected to include the different aspects of the relations (1010) between clinical factors CF1, CF2, CF3 and depending health outcome. One recommendation basis can be the margin of improvement ΔCF3 (1030) for a clinical factor CF3 resulting in a recommendation (1032) for addressing clinical factors by their respective margin of improvement. Another recommendation basis can be the contribution (1014) of a clinical factor CF2 to the health outcome resulting in a recommendation (1042) for addressing clinical factors by their respective contribution. Yet another recommendation basis can be the combination of contributions (1012, 1014, 1016) of clinical factors CF1, CF2, CF3 and their respective margins of improvement ΔCF1, ΔCF2, ΔCF3 resulting in a recommendation (1052) for addressing clinical factors by a criterion reflective of an expected impact. Similar to FIG. 7, the contributions 1012, 1014, 1016 can be displayed with different colors and thicknesses.

Figure 11:
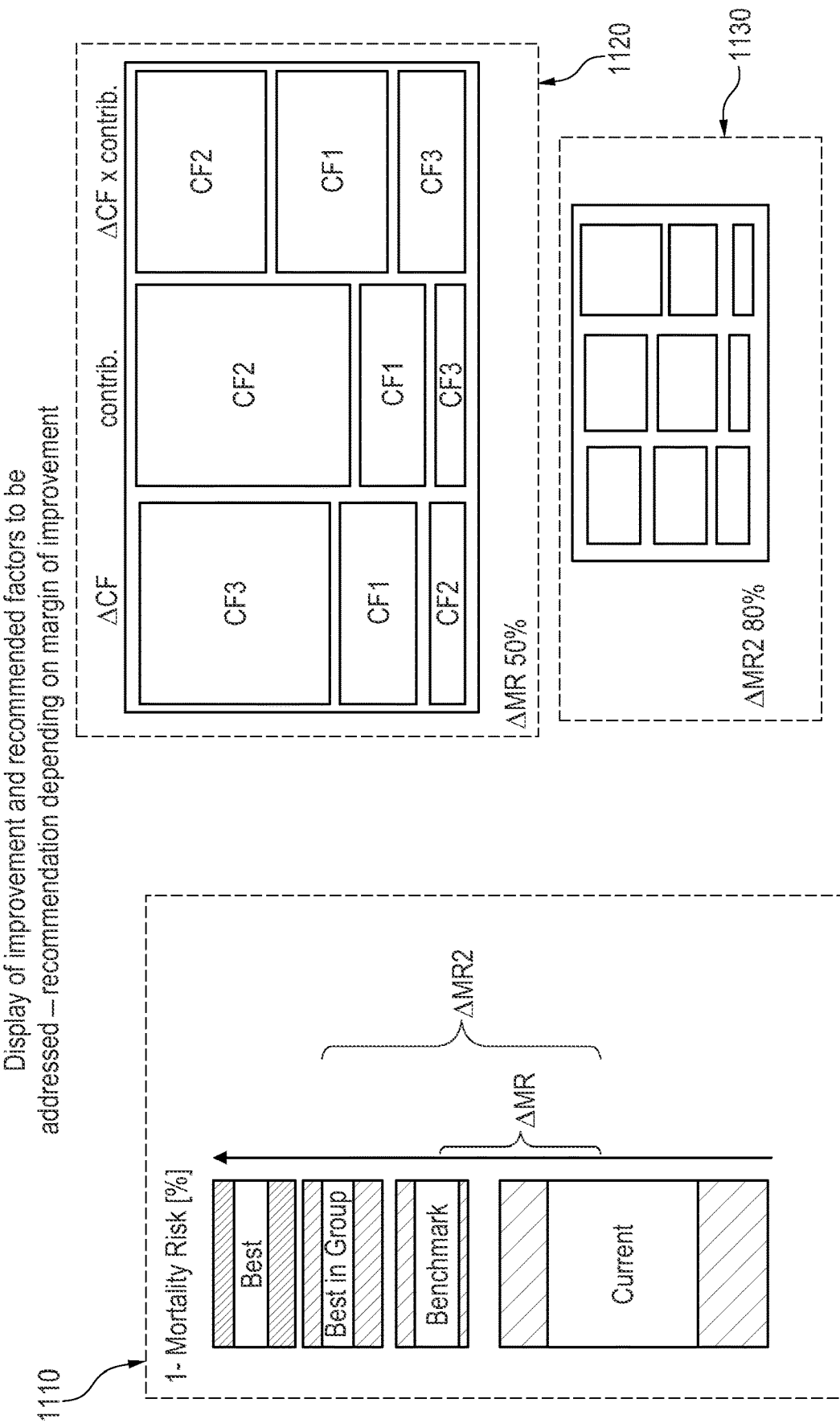
FIG. 11 depicts a comparison of results as a function of a (selectable) recommendation basis over time.

FIG. 11 shows a comparison of recommendation results as a function of a (selectable) benchmark group. The health outcome, here mortality risk, can be compared to different groups of benchmarking (1110), e.g. an average benchmark or a best performing healthcare unit in a comparable group of units. The recommendations (1120, 1130) for addressing certain clinical factors CF1, CF2, CF3 depending on recommendation basis (margin of improvement, contribution, combination of both) are different depending on the selected benchmark group and/or resulting margin of improvement for the health outcome ΔMR1 (1120), ΔMR2 (1130).

Figure 12:
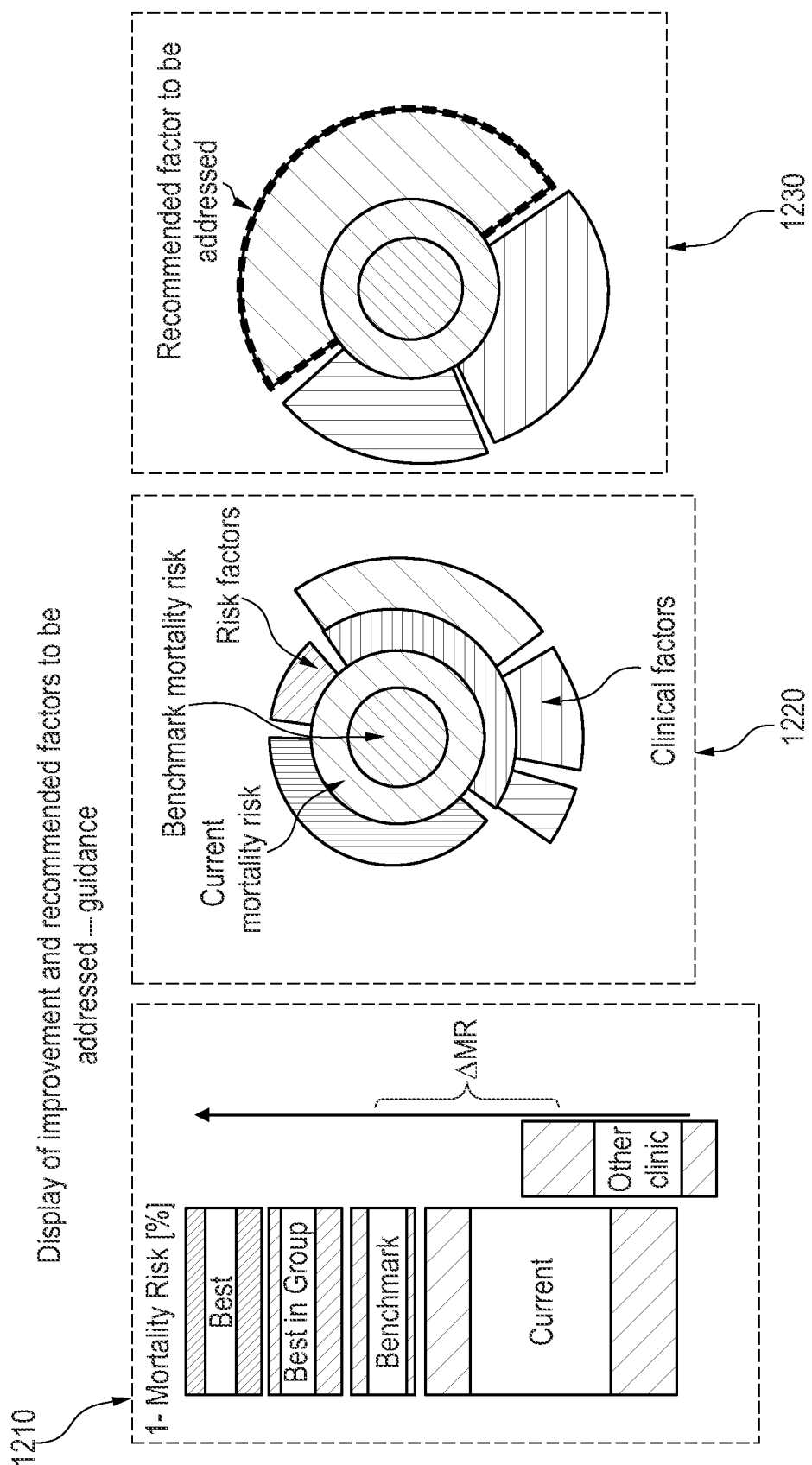
FIG. 12 depicts a first exemplary recommendation per graphical display.

FIG. 12 shows a first exemplary recommendation per graphical display. As shown in FIG. 12, the GUI shows a continuous user guidance by displaying of recommendation and reasoning for that:
displayed interface is suitable to offer more to the user than "just" presentation of information; and
dynamic elements are adapted to current situation to improve the interface of user and the displayed information.

As shown in FIG. 12, a certain health outcome, here mortality, of a certain current healthcare unit is in comparison to different benchmarking health outcomes (1210) with resulting margin of improvement ΔMR as compared to the respective benchmark. The recommendation is displayed in a dynamic GUI (1220, 1230) with respective graphical elements corresponding to the specific clinic's health outcome, elements corresponding to the benchmarking value, elements corresponding to risk factors contributing to the health outcome, and elements corresponding to contributing clinical factors. The elements are preferably arranged in a circular setup with the radii of current and benchmarking health outcome scaling with their numerical value, and particularly the difference between their radii scaling with the margin of improvement ΔMR. Contributing risk factors and clinical factors are arranged around the health outcome with their circular segment area scaling with the degree of their respective contribution to the health outcome. A recommendation of a clinical factor to be addressed, e.g. best suited for improving the health outcome, is displayed by highlighting the circular segment corresponding to the clinical factor (1230), e.g. by framing the corresponding segment (see the boundary of the upper right section being extra frame with a dashed line). This framing can be done with any other highlighting lines instead of the dashed line. The described recommendation by GUI is dynamic as it adapts to current clinical data and user selections, and the user is enabled to evaluate the relations between health outcome and risk/clinical factors as well as a projected impact of addressing certain factors. The displayed recommendation therefore is transparent with respect to the dynamics of the underlying reasoning.

Figure 13:
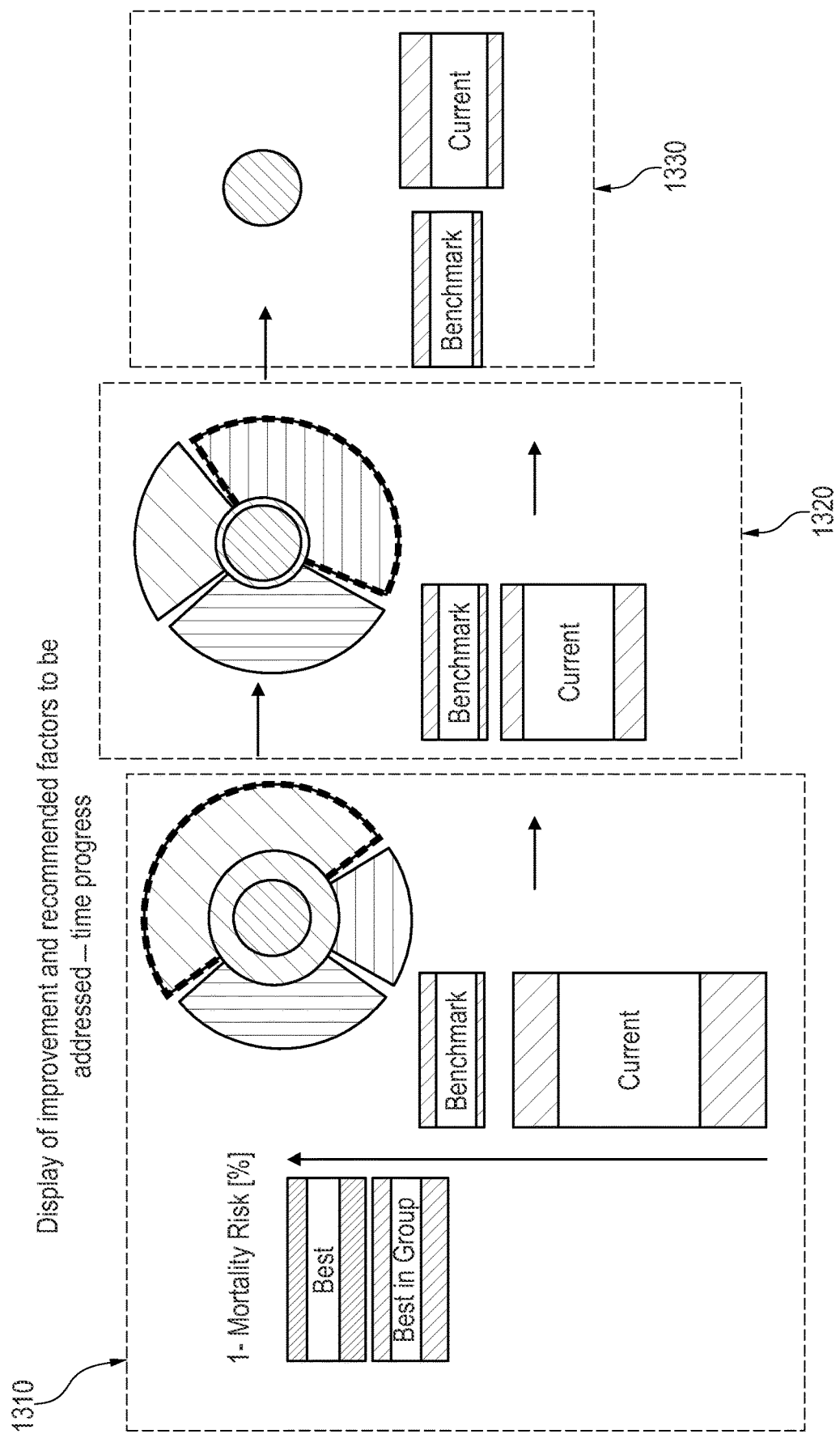
FIG. 13 depicts a second exemplary recommendation per graphical display.

FIG. 13 shows a second exemplary recommendation per graphical display. As shown in FIG. 13, the GUI shows progress of the clinical factors, the resulting improvement in mortality risk, and the changing recommendation.

As shown in FIG. 13, the recommendation highlights the clinical factor best to be addressed at the current clinical state (1310). A modification of the recommended factor results in an improvement of the health outcome (1320), i.e. the margin if improvement as compared to a benchmark value is reduced. The radii of the circular elements of the GUI corresponding to current health outcome and benchmarking value approach each other and a possibly other clinical factor best suited to address in the changed clinical state is highlighted. If there is no margin if improvement left, no recommendation is displayed (1330).

Figure 14:
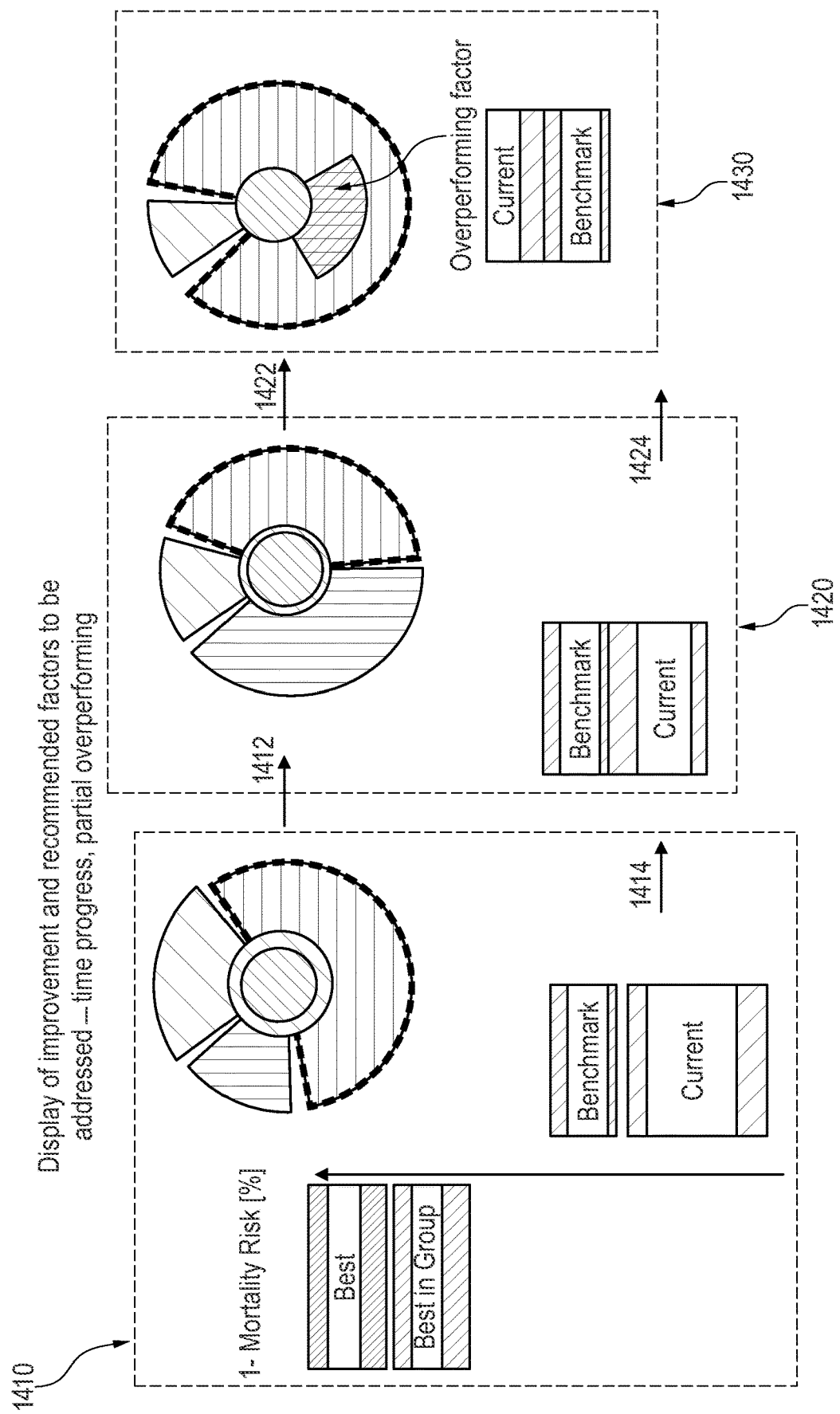
FIG. 14 depicts a third exemplary recommendation per graphical display.

FIG. 14 shows a third exemplary recommendation per graphical display.

As shown in FIG. 14, the GUI elements evolve according to modified clinical factors as recommended (1410, 1420). The current clinical health outcome approaches the benchmark value (1414). This improvement and accordingly changing clinical factor impacts, and the resulting recommendation are changing (1412). When the current clinical health outcome further improves (1424) and becomes better than the benchmarking value (1430), the recommendation is changing (1422) to highlight overperforming factors, i.e. factors that can be reduced without negatively affecting the health outcome. Alternatively, e.g. by user selection, the benchmarking value is changed to a benchmark group with positive margin of improvement.

It will be appreciated that the execution of the various machine-implemented processes and steps described herein may occur via the execution, by one or more respective processors, of processor-executable instructions stored on a tangible, non-transitory computer-readable medium, such as random access memory (RAM), read-only memory (ROM), programmable read-only memory (PROM), and/or another electronic memory mechanism. Thus, for example, operations performed by a medical device, a medical system, or other devices as discussed herein may be carried out according to instructions stored on and/or applications installed on one or more respective computing devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The invention claimed is:

1. A system, comprising:
a plurality of dialysis machines;
a plurality of gateways in communication with the plurality of dialysis machines; and
one or more servers;
wherein the plurality of dialysis machines are configured to:
perform dialysis treatments for respective patients associated with the plurality of dialysis machines;
obtain data associated with the respective patients, including treatment-related data; and send the obtained data to the one more servers via the plurality of gateways and a communication network;

wherein the one or more servers are configured to:

receive the data associated with the respective patients;

compute, based on the received data, for the respective patients, expected frequencies of at least one type of health outcome, wherein computing the expected frequencies of the at least one type of health outcome comprises: obtaining one or more analytical models for a set of features extracted from the data and for the at least one type of health outcome; and generalize the computed expected frequencies of the at least one type of health outcome for the respective patients into one or more individual-level impact metrics associated with risk factors for the at least one type of health outcome, wherein the risk factors comprise one or more modifiable risk factors and one or more un-modifiable risk factors; and wherein the one or more servers are further configured to:

set up a model architecture based on a Continuous Quality Improvements (CQI) structure; and train n+m risk models based on the obtained one or more analytical models and the model architecture, wherein n represents the number of the at least one type of health outcome and m represents the number of the one or more modifiable risk factors.

2. A system comprising:

a plurality of dialysis machines;

a plurality of gateways in communication with the plurality of dialysis machines; and one or more servers;

wherein the plurality of dialysis machines are configured to:

perform dialysis treatments for respective patients associated with the plurality of dialysis machines;

obtain data associated with the respective patients, including treatment-related data; and send the obtained data to the one or more servers via the plurality of gateways and a communication network;

wherein the one or more servers are configured to:

receive the data associated with the respective patients;

compute, based on the received data, for the respective patients expected frequencies of at least one type of health outcome, wherein computing the expected frequencies of the at least one type of health outcome comprises: obtaining one or more analytical models for a set of features extracted from the data and for the at least one type of health outcome; and generalize the computed expected frequencies of the at least one type of health outcome for the respective patients into one or more individual-level impact metrics associated with risk factors comprise one or more modifiable risk factors and one or more un-modifiable risk factors; and wherein generalizing the computed expected frequencies of the at least one type of health outcome for the respective patients comprises:

applying aggregation rules to translate the computed expected frequencies for the respective patients into a dialysis-machine-level expected frequency for each of the dialysis machines;

identifying a level of contribution of each of the risk factors to the dialysis machine-level expected frequency of the at least one type of health outcome for each of the dialysis machines within the plurality of dialysis machines, or a benchmarking subset thereof; and computing the one or more individual-level impact metrics associated with the risk factors based on the identified level of contribution.

3. The system of claim 2, wherein the one or more servers are further configured to:

consolidate the received data.

4. The system of claim 3, wherein the one or more servers are further configured to:

extract a set of features from the received data.

5. The system of claim 2, wherein the one or more analytical models comprise an exponential distribution family, a derivative of an exponential distribution family, a Bayesian network, an artificial neural network, and/or a non-parametric method.

6. The system of claim 5, wherein the non-parametric method comprises use of a decision tree, k-Nearest neighbors, and/or a support vector machine.

7. The system of claim 2, wherein the one or more servers are further configured to:

set up a model architecture based on a Continuous Quality Improvements (CQI) structure.

8. The system of claim 7, wherein the one or more servers are further configured to:

train n+m risk models based on the obtained one or more analytical models and the model architecture, wherein n represents the number of the at least one type of health outcome and m represents the number of the one or more modifiable risk factors.

9. The system of claim 8, wherein the one or more servers are further configured to:

evaluate calibration and accuracy of the n+m risk models in a test set.

10. The system of claim 8, wherein the one or more servers are further configured to:

adjust the risk models based on a newly configured model architecture and model parameters.

11. The system of claim 2, wherein the one or more servers are further configured to:

apply the one or more analytical models to collected data to compute the expected frequencies for the at least one type of health outcome for the respective patients.

12. The system of claim 2, wherein the one or more servers are further configured to:

construct, for each dialysis machine of the plurality of dialysis machines, or a subset thereof, a standard population scenario to estimate, based on the one or more individual-level impact metrics, a modified expected frequency of the at least one type of health outcome that would be expected if a distribution of the one or more un-modifiable risk factors was fixed to a distribution observed in the standard population.

13. The system of claim 12, wherein the one or more servers are further configured to:

rank the dialysis machines of the plurality of dialysis machines, or the subset thereof, based on the estimated modified expected frequencies of the at least one type of health outcome that would be expected in the standard population.

14. The system of claim 2, wherein the one or more servers are further configured to:

identify a level of contribution of each of one or more new risk factors to an expected frequency of the at least one type of health outcome for at least one dialysis machine of the plurality of dialysis machines, wherein the one or more new risk factors are associated with one or more emerging medical needs.

15. The system of claim 14, wherein the one or more servers are further configured to:
- rank the one or more emerging medical needs based on the corresponding identified level of contribution to the expected frequency of the at least one type of health outcome.

16. The system of claim 14, wherein the one or more servers are further configured to, for at least one of the one or more modifiable risk factors:
- define a target frequency of the at least one type of health outcome at a target dialysis machine;
- compute patient-level target achievement probabilities at the target dialysis machine based on dialysis-machine-level impact metrics;
- aggregate the patient-level target achievement probabilities to compute an expected target achievement prevalence at the target dialysis machine; and
- compute an expected margin of improvement for the target dialysis machine by comparing the expected target achievement prevalence with a prevalence based on a distribution of the one or more un-modifiable risk factors observed in a standard population.

17. The system of claim 16, wherein the one or more servers are further configured to:
- display, on a graphical user interface (GUI), the expected margin of improvement for the one or more modifiable risk factors for the dialysis machine; and/or
- display, on the GUI, guidance for addressing at least one unmet medical need for the dialysis machine, wherein the unmet medical need is associated with under-achievement in the one or more modifiable risk factors for which an actionable improvement margin has been discovered based on the computed expected margin of improvement; and/or
- display, on the GUI, for the target dialysis machine, a sequence of features to modify with respect to successive risk reduction of the at least one type of health outcome, based on the computed expected margin of improvement.

18. A system comprising:
a plurality of dialysis machines;
a plurality of gateways in communication with the plurality of dialysis machines; and
one or more servers;
wherein the plurality of dialysis machines are configured to:
- perform dialysis treatments for respective patients associated with the plurality of dialysis machines;
- obtain data associated with the respective patients, including treatment-related data; and
- send the obtained data to the one or more servers via the plurality of gateways and a communication network;

wherein the one or more servers are configured to:
- receive the data associated with the respective patients, expected frequencies of at least one type of health outcome, wherein computing the expected frequencies of the at least one type of health outcome comprises: obtaining one or more analytical models for a set of features extracted from the data and for the at least one type of health outcome; and
- generalize the computed expected frequencies of the at least one type of health outcome for the respective patients into one or more individual-level impact metrics associated with risk factors for the at least one type of health outcome, wherein the risk factors comprise one or more modifiable risk factors and one or more un-modifiable risk factors; and wherein the one or more servers are further configured to:
- aggregate the one or more individual-level impact metrics associated with one or more risk factors for each dialysis machine of the plurality of dialysis machines, or a subset thereof; and
- normalize the one or more individual-level impact metrics into a dialysis-machine-level impact metric for each dialysis machine of the plurality of dialysis machines, or the subset thereof.

* * * * *